(12) United States Patent
Yokum et al.

(10) Patent No.: US 12,557,196 B2
(45) Date of Patent: *Feb. 17, 2026

(54) TIMING ADJUSTMENTS FOR ACCURATE ZERO-CROSSING DETERMINATION

(71) Applicant: Leviton Manufacturing Co., Inc., Melville, NY (US)

(72) Inventors: Brian Anthony Yokum, New Orleans, LA (US); Ronald James Gumina, Mandeville, LA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/405,668

(22) Filed: Jan. 5, 2024

(65) Prior Publication Data

US 2024/0147594 A1 May 2, 2024

Related U.S. Application Data

(63) Continuation of application No. 17/804,005, filed on May 25, 2022, now Pat. No. 11,871,493.
(Continued)

(51) Int. Cl.
*H05B 47/10* (2020.01)

(52) U.S. Cl.
CPC .................................. *H05B 47/10* (2020.01)

(58) Field of Classification Search
CPC .............................. H05B 47/10; H05B 45/31
See application file for complete search history.

(56) References Cited

U.S. PATENT DOCUMENTS

| 4,894,621 A | 1/1990 | Koenig et al. |
| 5,020,026 A | 5/1991 | Schreck et al. |

(Continued)

FOREIGN PATENT DOCUMENTS

| WO | 2020068089 | 4/2020 |

OTHER PUBLICATIONS

Ex Parte Quayle Office Action issued in U.S. Appl. No. 17/058,876 on Sep. 21, 2023, 56 pgs.
(Continued)

*Primary Examiner* — Minh Tran
(74) *Attorney, Agent, or Firm* — Matthew M. Hulihan; Heslin Rothenberg Farley Mesiti P.C.

(57) ABSTRACT

Timing adjustment for accurate zero-crossing determination includes obtaining time offset(s) representing amounts of time between (i) zero-crossings of an input signal waveform, representative of an input AC waveform, input to a zero-crossing detector circuit and (ii) corresponding transitions of an output signal from an output of the circuit to a microcontroller, and determining times of the zero-crossings of the input AC waveform, which includes determining times of the corresponding transitions as detected by the microcontroller and adjusting the determined times using the time offset(s) to produce the times of the zero-crossings of the input AC waveform. In another aspect, input AC frequency is determined by determining pulse width(s) of pulse(s) of the output signal, and adjusting a half-cycle time corresponding to the pulse width(s) using the time offset(s) to provide a duration of half-cycles of the input AC waveform and inform a frequency of the input AC waveform.

36 Claims, 11 Drawing Sheets

Related U.S. Application Data

(60) Provisional application No. 63/197,013, filed on Jun. 4, 2021.

(56) References Cited

U.S. PATENT DOCUMENTS

| | | | |
|---|---|---|---|
| 6,380,692 | B1 | 4/2002 | Newman |
| 6,717,394 | B2 | 4/2004 | Elms |
| 8,324,761 | B2 | 12/2012 | Elliot et al. |
| 8,618,751 | B2 | 12/2013 | Ostrovsky et al. |
| 9,681,526 | B2 | 6/2017 | Ostrovsky et al. |
| 9,860,949 | B2 | 1/2018 | Tyson |
| 9,974,152 | B2 | 5/2018 | Ostrovsky et al. |
| 10,251,228 | B1 | 4/2019 | Lester et al. |
| 10,568,185 | B1 | 2/2020 | Ostrovsky |
| 11,301,013 | B2 | 4/2022 | Bull |
| 11,515,779 | B2 | 11/2022 | Yokum et al. |
| 11,871,493 | B2 * | 1/2024 | Yokum .............. H05B 47/10 |
| 2002/0070719 | A1 | 6/2002 | Amarillas et al. |
| 2003/0178892 | A1 | 9/2003 | Black et al. |
| 2005/0146288 | A1 | 7/2005 | Johnson |
| 2005/0275354 | A1 | 12/2005 | Hausman |
| 2006/0279236 | A1 | 12/2006 | Johnson |
| 2007/0110192 | A1 | 5/2007 | Steiner |
| 2007/0188025 | A1 | 8/2007 | Keagy |
| 2007/0262654 | A1 | 11/2007 | Mosebrook |
| 2008/0024074 | A1 * | 1/2008 | Mosebrook .......... H05B 39/08 315/291 |
| 2010/0060187 | A1 * | 3/2010 | Newman, Jr. ........ H05B 45/39 315/291 |
| 2010/0194304 | A1 | 8/2010 | Mosebrook et al. |
| 2010/0283391 | A1 | 11/2010 | Braunshtein |
| 2012/0074792 | A1 | 3/2012 | Hodges et al. |
| 2012/0229170 | A1 | 9/2012 | Scholder |
| 2013/0162168 | A1 | 6/2013 | Ostrovsky et al. |
| 2013/0181630 | A1 | 7/2013 | Taipale |
| 2013/0293137 | A1 | 11/2013 | Jennings |
| 2014/0081474 | A1 | 3/2014 | Blakeley |
| 2014/0327372 | A1 | 11/2014 | Zhang et al. |
| 2016/0278176 | A1 | 9/2016 | Chen |
| 2017/0150566 | A1 | 5/2017 | Vanderzon |
| 2017/0171950 | A1 | 6/2017 | Barna et al. |
| 2017/0223808 | A1 | 8/2017 | Barna et al. |
| 2018/0115161 | A1 | 4/2018 | Marsh-Croft |
| 2018/0160494 | A1 | 6/2018 | Vanderzon |
| 2019/0191518 | A1 | 6/2019 | Guan et al. |
| 2020/0084852 | A1 | 3/2020 | DeJonge et al. |
| 2021/0289596 | A1 | 9/2021 | Vanderzon et al. |
| 2021/0321502 | A1 | 10/2021 | Ostrovsky et al. |
| 2021/0367502 | A1 * | 11/2021 | Yokum ............... H02M 5/2932 |
| 2021/0368598 | A1 | 11/2021 | Sanghvi |
| 2022/0394835 | A1 | 12/2022 | Yokum et al. |
| 2024/0373522 | A1 | 11/2024 | Sanghvi et al. |

OTHER PUBLICATIONS

Notice of Allowance issued in U.S. Appl. No. 17/804,005 on Sep. 1, 2023, 9 pgs.

Office Action issued in U.S. Appl. No. 17/804,005 on Mar. 1, 2023, 17 pgs.

Office Action issued in U.S. Appl. No. 18/049,348 on Feb. 13, 2023, 48 pgs.

International Search Report and Written Opinion for PCT/US2020/070109 completed Aug. 18, 2020, 15 pgs.

International Search Report and Written Opinion for PCT/US2018/053260 completed Nov. 15, 2018, 8 pgs.

International Search Report and Written Opinion for PCT/US2020/060328 completed Mar. 30, 2021, 22 pgs.

Non Final Office Action issued in U.S. Appl. No. 17/267,520 on Dec. 8, 2021, 6 pgs.

Non Final Office Action issued in U.S. Appl. No. 17/267,520 on Aug. 10, 2021, 15 pgs.

Notice of Allowance issued in U.S. Appl. No. 17/267,520 on Jun. 2, 2022, 8 pgs.

Office Action in U.S. Appl. No. 17/325,164 dated Apr. 25, 2022, 39 pgs.

Office Action in U.S. Appl. No. 17/804,005 dated Mar. 1, 2023, 17 pgs.

Notice of Allowance in U.S. Appl. No. 17/804,005 dated Sep. 1, 2023, 9 pgs.

Notice of Allowance issued in U.S. Appl. No. 17/325,164 on Jul. 28, 2022, 14 pgs.

Notice of Allowance issued in U.S. Appl. No. 18/477,646 on Apr. 11, 2024. 26 pgs.

* cited by examiner

TIMING ADJUSTMENTS FOR ACCURATE ZERO-CROSSING DETERMINATION

BACKGROUND

Typical electrical load controllers for controlling conduction of a supply of alternating current (AC) power to a load vary the supply of AC power by varying the points during the AC waveform when power is switched on and off to the attached load. For example, a dimmer for varying the brightness of a lighting load or the speed of a fan varies the points during the AC waveform that power is switched on and off to the attached load in order to achieve the proper dimming level.

In lighting control in particular, precise control of these switching points is desired to minimize perceived variation in the brightness of the light and to minimize flickering of the light. Many microprocessor-based dimmers detect the zero-crossings of the AC waveform and switch the power to the load on/off at a fixed time relative to the zero-crossing each half-cycle in order to achieve the desired lighting level. Incorrectly identifying the actual zero-crossing times of the AC waveform can result in perceptible changes in the brightness of the light or flickering, as noted. A difference in which points/angles along an input signal waveform used to detect the positive-going zero-crossings in contrast to the negative-going zero-crossings can also result in perceptible flickering of the light.

SUMMARY

Shortcomings of the prior art are overcome and additional advantages are provided through the provision of a method of operating an electrical load controller for controlling conduction of a supply of alternating current (AC) power to a load. The supply of AC power has an input AC waveform that is input to the electrical load controller at a line input terminal of the electrical load controller. The input AC waveform includes zero-crossings between positive and negative half-cycles of the input AC waveform, and the method includes obtaining at least one time offset, the at least one time offset representing amounts of time between (i) zero-crossings of an input signal waveform, representative of the input AC waveform, at an input of a zero-crossing detector circuit of the electrical load controller and (ii) corresponding transitions of an output signal from an output of the zero-crossing detector circuit to a microcontroller of the electrical load controller. Each of the corresponding transitions corresponds to a respective zero-crossing of the zero-crossings of the input signal waveform and indicates a respective zero-crossing of the input AC waveform. The method also includes determining times of the zero-crossings of the input AC waveform, the determining the times of the zero-crossings of the input AC waveform including determining times of the corresponding transitions as detected by the microcontroller, and adjusting the determined times of the corresponding transitions to produce the times of the zero-crossings of the input AC waveform, wherein the adjusting uses the at least one time offset.

Further, an electrical load controller is provided for controlling conduction of a supply of alternating current (AC) power to a load, the supply of AC power having an input AC waveform, the input AC waveform comprising zero-crossings between positive and negative half-cycles of the input AC waveform. The electrical load controller includes a line input terminal and a load output terminal, the line input terminal configured to be electrically coupled to the supply of AC power and receive the input AC waveform thereof, and the load output terminal configured to be electrically coupled to the load. The electrical load controller also includes a switching circuit electrically coupled in series between the line input terminal and the load output terminal, the switching circuit having an ON state in which the switching circuit conducts the supply of AC power to the load, and an OFF state in which the switching circuit does not conduct the supply of AC power to the load. The electrical load controller additionally includes a zero-crossing detector circuit configured to receive an input signal waveform, representative of the input AC waveform, at an input of the zero-crossing detector circuit and to output an output signal from an output of the zero-crossing detector circuit, and a microcontroller, the microcontroller configured to receive from the zero-crossing detector circuit the output signal therefrom, and to perform a method that includes obtaining at least one time offset, the at least one time offset representing amounts of time between (i) zero-crossings of the input signal waveform at the input of the zero-crossing detector circuit and (ii) corresponding transitions of the output signal from the output of the zero-crossing detector circuit to the microcontroller. Each of the corresponding transitions corresponds to a respective zero-crossing of the zero-crossings of the input signal waveform and indicates a respective zero-crossing of the input AC waveform. The method also includes determining times of the zero-crossings of the input AC waveform, the determining the times of the zero-crossings of the input AC waveform including determining times of the corresponding transitions as detected by the microcontroller, and adjusting the determined times of the corresponding transitions to produce the times of the zero-crossings of the input AC waveform, wherein the adjusting uses the at least one time offset.

Further, an electrical load controller is provided for controlling conduction of a supply of alternating current (AC) power to a load, the supply of AC power having an input AC waveform, the input AC waveform including zero-crossings between positive and negative half-cycles of the input AC waveform. The electrical load controller includes a line input terminal and a load output terminal, the line input terminal configured to be electrically coupled to the supply of AC power and receive the input AC waveform thereof, and the load output terminal configured to be electrically coupled to the load. The electrical load controller also includes a switching circuit electrically coupled in series between the line input terminal and the load output terminal, the switching circuit having an ON state in which the switching circuit conducts the supply of AC power to the load, and an OFF state in which the switching circuit does not conduct the supply of AC power to the load. The electrical load controller additionally includes a zero-crossing detector circuit configured to receive an input signal waveform, representative of the input AC waveform, at an input of the zero-crossing detector circuit and to output an output signal from an output of the zero-crossing detector circuit, the output signal including a plurality of pulses during each of which the output signal remains in an active state. The electrical load controller further includes a microcontroller, the microcontroller configured to receive from the zero-crossing detector circuit the output signal therefrom, and to perform a method that includes obtaining at least one time offset, the at least one time offset representing amounts of time between (i) zero-crossings of the input signal waveform at the input of the zero-crossing detector circuit and (ii) corresponding transitions of the output signal from the output of the zero-crossing detector circuit to the microcontroller. Each of the corresponding transitions corresponds to a respective zero-crossing of the zero-crossings of the input signal waveform and indicates a respective zero-crossing of the input AC waveform. The method also includes determining one or more pulse widths of a corresponding one or more pulses of the plurality of pulses, each pulse width of the one or more pulse widths indicating timing between a respective pair of consecutive zero-crossings of the input signal waveform, determining a half-cycle time corresponding to the one or more pulse widths, the half-cycle time representing duration of half-cycles of the input signal waveform, adjusting the half-cycle time using the at least one time offset to provide a duration of half-cycles of the input AC waveform, and determining a frequency of the input AC waveform using the adjusted half-cycle time.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
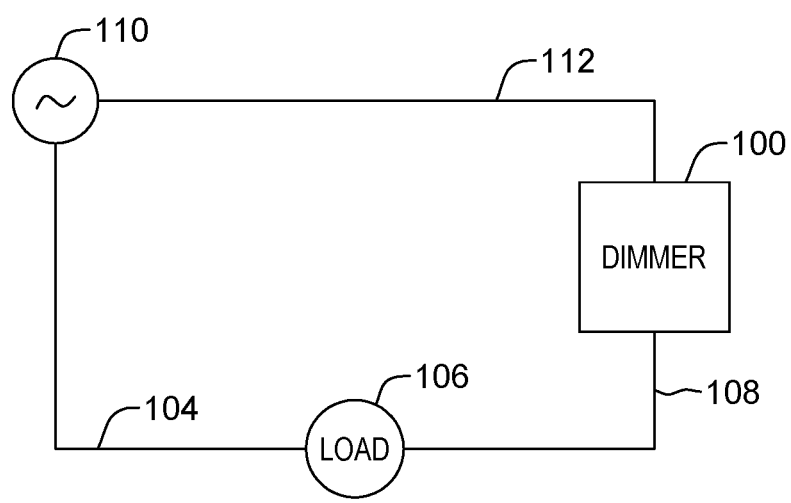
FIG. 1 depicts an example environment including an electrical load controller.

It is common for a dimmer (synonymously referred to herein as an electrical load controller) to incorporate a zero-crossing detector circuit to detect zero-crossings of an AC waveform input to the dimmer Many zero-crossing detector circuits, such as those using an analog comparator, suffer from an asymmetry in the zero-crossing detection, the asymmetry being caused by the small but non-zero switching threshold(s) used by the detection circuitry to indicate a zero-crossing. This can result in switching power to the load at different points relative to the true zero-crossing of each half-cycle. The input signal provided to the zero-crossing detector circuit and on which its output signal is based may also differ in phase from the AC waveform of the incoming AC power due to input circuitry, such as filtering components, between the incoming AC waveform and the input to the zero-crossing detector circuit. This phase difference can also negatively impact performance unless corrected-for because zero-crossings of the input signal waveform at the input of the zero-crossing detector circuit would inherently be out-of-alignment with the zero-crossings of the input AC waveform and thus the timings of zero-crossings of the input signal waveform would not properly reflect those of the input AC for timer-based switching of the input AC to the load.

Aspects described herein can offer improvements over conventional dimmer technology. For instance, aspects can more accurately determine true timing of zero-crossing points of the AC waveform, and consequently eliminate flickering or other adverse effects caused by differences in the zero-crossing detection between positive and negative-going half-cycles of the AC waveform. Various delays imparted by circuitry of the dimmer can result in delays in the timing when zero-crossing indications are provided to the microcontroller by the zero-crossing detector circuit output. In some embodiments, an electrical load controller applies an error correction factor to adjust for a phase difference between the incoming AC waveform and the input signal waveform that is input to the zero-crossing detector circuit. Additionally or alternatively, the electrical load controller applies one or more error correction factors to adjust for (i) a phase difference between the positive-going zero-crossing indications of the input signal waveform at the input of the zero-crossing detector circuit and the switching (transitioning) of the detector output and/or (ii) a phase difference between the negative-going zero-crossing indications of the input signal waveform at the input of the zero-crossing detector circuit and the switching (transitioning) of the detector output. These error correction factors are used by the microcontroller (in some embodiments) to adjust the timings of the zero-crossing indications that were provided to it, in order to produce more accurate timings of the zero-crossings of the input AC waveform that is input to the electrical load controller.

In accordance with further aspects, the accurately determined zero-crossing points of the AC waveform can be used to accurately determine a current, i.e. at that time, AC waveform frequency. Based on the resulting frequency that is more accurate, the times when the load should be switched on and off (relative to the true zero-crossings of the AC waveform) can be more accurately determined in order to achieve the desired output.

Aspects described herein can be particularly useful in applications where the power delivered to a connected load is to be switched at precise times relative to the zero-crossings of the incoming AC waveform. Typical applications would be lighting controls utilizing semiconductor switching elements such as TRIAC and MOSFET-based dimmers.

Accordingly, provided are approaches for more accurately determining the true zero-crossing points of an AC waveform, which can improve the switching of an attached load. A component, such as the microcontroller, of the electrical load controller applies error correction factor(s) in the form of time offsets, which are amounts of time, to the times of detected transitions in the output signal from the zero-crossing detector circuit. These correction factors can adjust for errors that are introduced by circuitry on the input of the zero-crossing detector circuit and/or introduced by the switching characteristics of the zero-crossing detector circuit itself.

As context for aspects described herein, many countries have an electric grid infrastructure that uses alternating current ("AC") as a power source (referred to herein as an "AC source") for supplying AC power. These systems can be either balanced or unbalanced and may include a phase line ("phase conductive path") and a return path (usually referred to as a "neutral" line or "neutral conductive path"). The "neutral" conductive path can be used as a return path for the AC source supplied by a phase conductive path. A conductive path can also be referred to as a "wire". The terms "conductive path", "conductor", and "wire" are considered herein to be synonymous. For safety reasons, the neutral wire is typically grounded at some juncture, for instance the main electrical panel. Although a ground wire is typically present at all electrical boxes, a neutral wire may not be present in some electrical boxes, such as switch boxes used to control a lighting load. In such instances, the electrical box typically contains a phase wire, a load wire, and a ground wire (or ground connection via a metal sheath of the electrical cable). As such, the lighting load is to be controlled by a device referred to as a "two-wire device" (examples of which are a switch or a dimmer), where the phrase "two-wire" refers to the phase wire and the load wire (e.g. the absence of a neutral wire), though a two-wire device does not exclude the possibility of the device being connected to a third, ground wire.

Many dwellings and office buildings use either a single or multi-phase AC source and/or some combination thereof. The AC source may be accessed by standardized connections, referred to as "plugs", that prevent a user from improperly connecting to an AC source, e.g., a three-phase AC plug cannot connect to a two-phase AC outlet. Additionally, many AC sources may selectively apply electricity to a load based upon whether a switch is turned on or off, e.g., a light switch.

In some approaches, zero-crossings of an input line voltage (input AC waveform) are detected by detecting a change in the polarity of the voltage across (i) an input line voltage terminal and an output load terminal or lead, in the case of two-wire devices without a neutral connection, or (ii) the input line voltage terminal and return neutral or ground wire terminal, as in three wire devices with a neutral connection or two-wire devices using a ground leakage path. "Terminal" can be any type of terminal, lead or other termination, and includes, but is not limited to, a screw terminal, which is just one example of a terminal of a dimmer circuit. In some embodiments, a direct connection by a dimmer circuit to a neutral side N of the AC power source can be available, enabling the dimmer circuit to be configured as a three-wire dimmer circuit.

Figure 2:
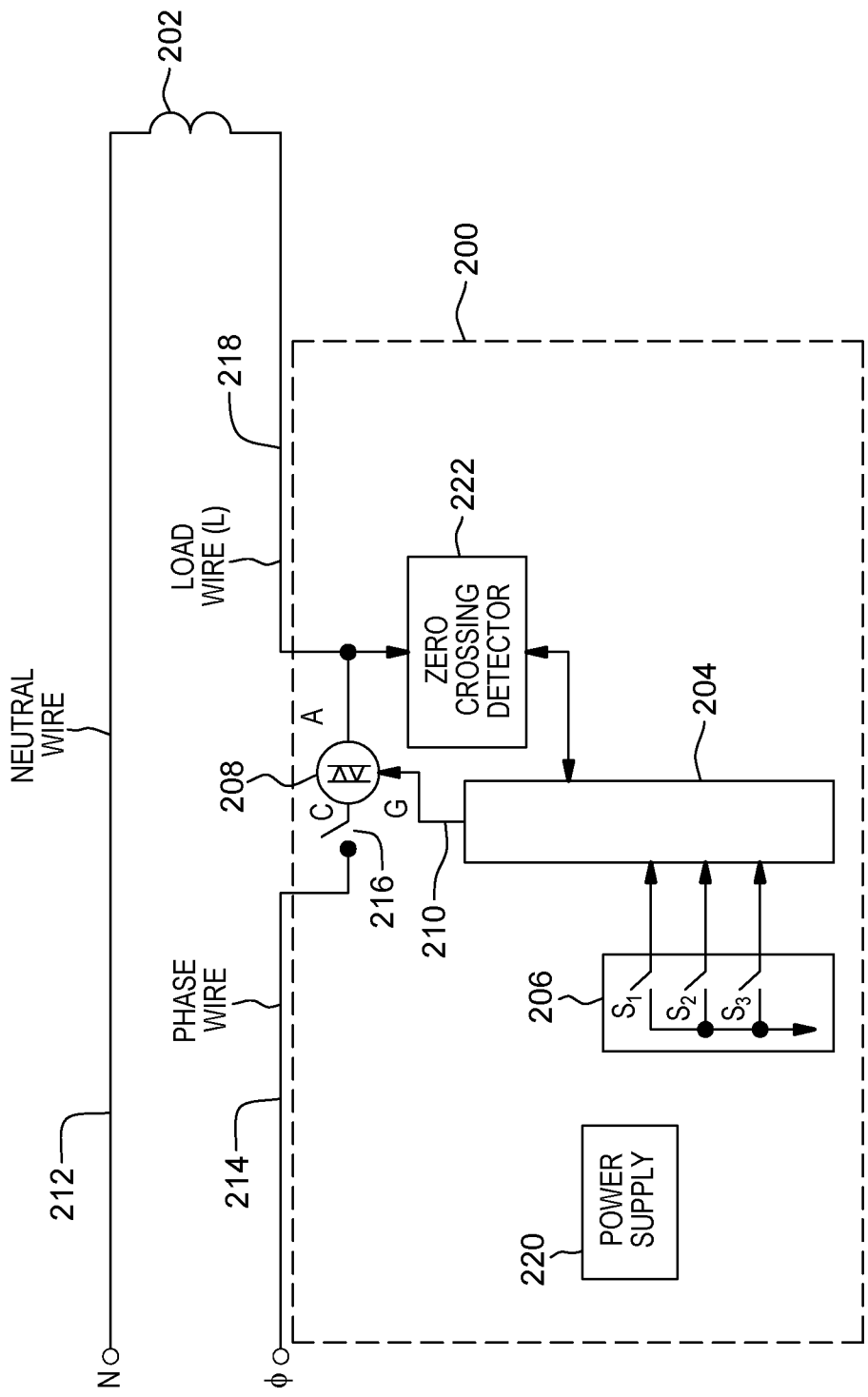
FIG. 2 depicts further details of an example electrical load controller to incorporate and use aspects described herein.

FIGS. 1 and 2 depict example aspects of an electrical load controller and surrounding environment. In particular, FIG. 1 depicts an example environment including electrical load controller and FIG. 2 depicts further details of an example electrical load controller to incorporate and use aspects described herein. In these examples, the electrical load controller is a two-wire dimmer. While two-wire dimmers are discussed, it is noted that aspects described herein apply as well to three-wire dimmers.

Referring to FIG. 1, two-wire dimmer 100 is shown, whereby AC power/current travels from AC source 110 via phase conductive path 112 through dimmer 100 and through load 106 via load wire or conductive path 108 to AC source 110 via neutral wire or conductive path 104. The dimmer 100 includes a circuit to control the power delivered to the load 106 by "chopping" the current coming from AC source 110. A controller/microcontroller may operate a power switch to regulate the power delivered to the load using a phase control technique. The AC source has a sinusoidal waveform that oscillates through cycles. More specifically, each sinusoidal cycle is referred to as a full cycle. Each full cycle includes a positive half-cycle and a negative half-cycle that complete a single full cycle of the AC power. The positive half-cycle begins at a first zero-crossing of the full cycle and ends at a midpoint zero-crossing at the midpoint of the full cycle. The negative half-cycle begins at the midpoint zero-crossing of the full cycle and ends at another zero-crossing at the end of the full cycle. For typical 60 Hz power, an entire AC cycle occurs in 1/60th of a second.

When employing "forward phase" dimming with a latching power switch or "switching circuit" (e.g., a TRIAC), the power switch remains off at the beginning of an AC half-cycle during a delay period until the desired firing angle is reached. The TRIAC is turned on at a firing angle by applying one or more pulses via a control signal to the gate of the TRIAC to connect the AC source to the load. Alternately, a constant/long duration pulse (as opposed to discrete pulses) can be supplied to the gate of the TRIAC to hold the TRIAC in a conducting state for the remainder of the half-cycle regardless of the level of current being conducted through the load. The portion of the AC voltage waveform actually applied to the load is that portion extending from the firing time to the end of, or near the end of, the half-cycle. The portion of the AC voltage waveform applied during that portion of the AC cycle is referred to as the conduction period of the positive half-cycle. The TRIAC continues conducting power to the load during this time until it switches off at (or near) the midpoint zero-crossing. In this regard, TRIACs are self-commutating devices, meaning that they would typically turn themselves off when the current through the device falls below a holding level after the control signal has been removed.

The same process can be repeated for the negative half-cycle, in which the TRIAC turns on after a delay period and turns off at (or near) the next zero-crossing, if the switching schedule is to fire in both half-cycles of each full cycle. In this regard, it is noted that switching may occur in only each positive half-cycle, only each negative half-cycle, or in both the positive and the negative half-cycles of the AC waveform, if desired. Generally, if the load is purely resistive, the current flowing through the load is essentially synchronized with the AC voltage applied to the load, with no or little phase shift between the current and the voltage. Additionally, the firing delay periods for the two half-cycles of a full cycle are generally equal in duration, though they could be different.

Varying the conduction period varies the percentage of available power delivered to the load, thereby regulating the total amount of power delivered to the load. If the load is a lighting load, regulating the amount of power controls the brightness of the load.

It is understood that while other types of power switches, like metal-oxide semiconductor field-effect transistor (MOSFETs) and insulated-gate bipolar transistors (IGBTs), are similarly used to control conduction and firing angles, the controlling of these switches may be different from the manner described above, which is provided by way of example only.

Some power switches, such as transistors and relays, receive a constant gate signal during the entire conduction period. Other power switches, such as TRIACs and silicon-controlled rectifiers (SCRs), have regenerative switching properties that cause them to latch in the conductive state in response to short gate pulse(s) if the load current exceeds a latching level. Once in the conductive state, the power switch remains conductive—even if the control signal is removed—until the current through the switch drops below a holding level. At that point, the power switch automatically switches off. This typically occurs when the load current drops below the holding level at or near a zero-crossing.

In FIG. 2, dimmer 200 receives power from the AC source via phase wire 214 and delivers power to load 202 via load wire 218. A supply of AC power from the AC source has an input AC waveform that is input to the dimmer at a line input terminal thereof.

The dimmer includes digital control electronics and code for execution to perform various aspects, including aspects described herein. The digital control electronics and/or code can be implemented via one or more processor, microprocessor, controller, microcontroller, processing circuit, or the like (which are referred to herein collectively as "microcontroller" or "microprocessor"). In the embodiment of FIG. 2, controller 204 is coupled to one or more user-accessible actuators 206. A user of dimmer 200 is able to engage or otherwise interface with actuator(s) 206 to provide command information, which the controller 204 receives and interprets as a command or a set of commands to perform one or more actions for or relating to controlling operation of the dimmer and therefore controlling the delivery of power to the load 202.

Dimmer 200 can control, for example, the amount of current flowing through load 202 by tailoring the parameters used for activating TRIAC 208. TRIAC 208 is a bidirectional three terminal semiconductor device that allows bidirectional current flow when an electrical "control" signal of proper amplitude is applied to its "G" (or gate) terminal via control conductive path 210. TRIAC 208 also has a "C" (or cathode terminal) and an "A" or anode terminal. When an electrical signal is applied to the gate G, TRIAC 208 is said to be gated. When properly gated, current (or another electrical signal) can flow from the "C" terminal to the "A" terminal or from the "A" terminal to the "C" terminal. When TRIAC is not gated or is not properly gated, relatively very little or substantially no current (or no signal) can flow between the "A" and "C" terminals. TRIAC 208 thus acts as an electrically controlled power switch that can allow some or no current flow based on the amplitude of the electrical signal applied to its "G" terminal. Alternatively, the switching component of FIG. 2 (TRIAC 208) could in some examples be implemented as two TRIACs TR1 and TR2, where TRIAC TR1 is controlled by controller 204, which applies a fire signal onto control conductive path 210 to turn on TRIAC TR2, which in turn gates TRIAC TR1 allowing an AC signal to pass through load 202 and back to the AC source via neutral wire 212.

Connected in series to TRIAC 208 is mechanical switch 216. Mechanical switch 216 can be an "air gap switch" that can be activated to stop current flow through the dimmer 200, thus stopping current flow through the load wire 218, load 202 and neutral wire 212. Mechanical switch 216 disconnects power to the dimmer 200 and load 202 to permit servicing and/or replacement of a light bulb, etc. TRIAC 208 can be gated to provide current amounts (e.g. via waveform chopping) related to intensities of load 202 (for example intensity of the light if load 202 includes a lighting element, fan speed if light 202 includes a fan, etc.) or can be gated to provide substantially no current, thus essentially switching off load 202.

Power supply 220 is provided to power operation of component(s) of dimmer 200. Power supply may receive power from the phase conductive path 214, in one example. The power supply 220 may power operation of controller 204. The controller 204 can be coupled to and communicate with a zero-crossing detector circuit 222. The zero-crossing detector circuit 222 receives at an input thereof an input signal waveform representative of the input AC waveform of the AC power, and outputs an output signal (zero-crossing signal) to the controller. An example such output signal transitions between Hi and Low states that correspond to and signal to the controller the zero-crossings of the input signal waveform that is input to the zero-crossing detector circuit, which themselves each indicate respective zero-crossings of the input AC waveform that is input to the dimmer. The controller 204 receives the output signal from the zero-crossing detector circuit and use this for various timing functions, such as the proper timing of pulses/signals that the controller 204 generates to control TRIAC 208.

The zero-crossing detector circuit is used to detect the zero-crossings of the incoming AC waveform of the supply of AC power and signal those zero-crossings to the controller. Various electronic circuits are available that can detect the zero-crossings of an AC waveform. Typically, though not always, the zero-crossing detector circuit includes a comparator used to determine whether the voltage of the input signal waveform input to the zero-crossing detector circuit exceeds a specified threshold. It provides a first output, such as a positive HI signal, when the voltage exceeds some threshold voltage, e.g. 1 volt (V), and a second output, such as a zero or "non-assertive", LOW signal, when the voltage is at or below the threshold. In this manner, the output signal presented from the zero-crossing detector circuit can present substantially as a square wave that transitions between two states, e.g. HI or "1" and LOW or "0". In some examples, the transition from LOW to HI represents a positive-going zero-crossing and the transition from HI to LOW represents a negative-going zero-crossing, though it may be the opposite.

Practical approaches can suffer from an asymmetry in the output of the zero-crossing detector circuit caused by a small, but non-zero, switching threshold (such as +1 V for instance) of the comparator. If the zero-crossing detector circuit is configured to transition the output signal when the input signal to the zero-crossing detector circuit reaches +1 V, that corresponds to a different point on the positive-going waveform transitions (i.e. into a positive half-cycle) than on the negative-going waveform transitions (i.e. into a negative-half cycle). When relying on positive-going and negative-going zero-crossings in switching power to the load, this can result in a bias on the switching, i.e. switching the load at different points relative to the true zero-crossing at the beginning of each half-cycle, based on the difference in timing between the two half-cycles. To avoid repeated switching around the threshold voltage, a zero-crossing detector circuit might incorporate hysteresis to cause the detector circuit to switch at one voltage on positive-going zero-crossings (those zero-crossings between the end of a negative half-cycle and the start of a positive half-cycle) of the input signal to the circuit and at a different voltage on negative-going zero-crossings (those zero-crossings between the end of a positive half-cycle and the start of a negative half-cycle) of the input signal.

The combined effect of a non-zero switching threshold and built-in hysteresis results in an asymmetry in the zero-crossing detector output signal. In addition, for a given nominal AC input frequency range, such as 50-60 Hz, circuitry between the line input terminal of the dimmer and the input of the zero-crossing detector circuit may produce a resulting phase difference as between the input AC waveform at the input terminal and the input signal waveform at the input of the zero-crossing detector circuit. This is common when there are frontend 'passive' components, such as resistive dividers or noise filters, between the input to the dimmer and the input to the zero-crossing detector circuit thereof. This can also contribute to differences in timing of zero-crossings as sensed by the controller versus the timing of the true zero-crossings of the AC waveform.

Figure 3A:
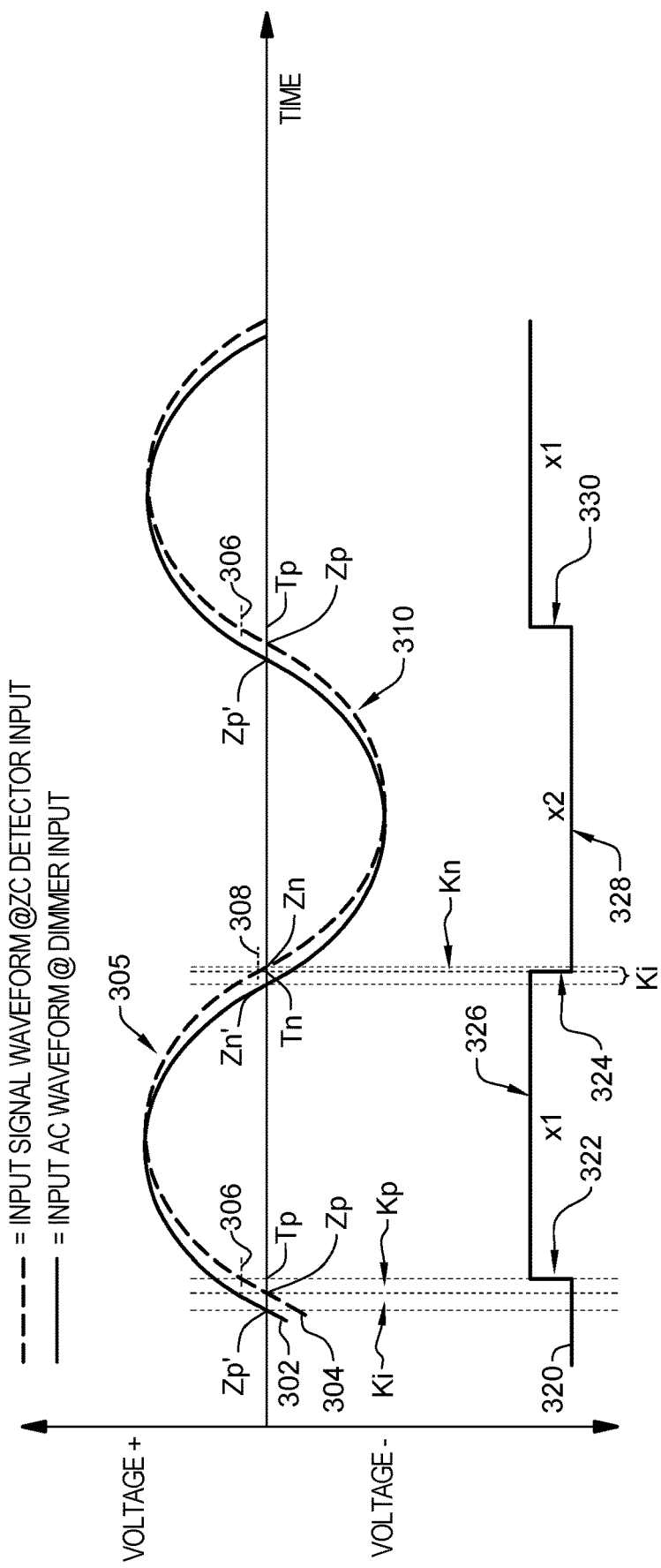
FIGS. 3A-3D depict example timing diagrams of an AC waveform, a corresponding input signal waveform input to a zero-crossing detector circuit, and corresponding transitions of an output signal from the zero-crossing detector circuit to a microcontroller, in accordance with aspects described herein.

FIGS. 3A-3D depict example timing diagrams of an AC waveform, a corresponding input signal waveform input to a zero-crossing detector circuit, and corresponding transitions of an output signal from the zero-crossing detector circuit to a microcontroller, in accordance with aspects described herein. Referring initially to FIG. 3A, voltage (y-axis) as a function of time (x-axis) shows incoming AC waveform 302 as substantially a sine wave with positive (voltage) and negative (voltage) half-cycles. The input AC waveform 302 is input to the electrical load controller at a line input terminal thereof. Various circuitry, if existing between the line input terminal and the input to the zero-crossing detector circuit, imparts a time delay in the electrical conduction of the input AC waveform at the input of the dimmer to the input of the zero-crossing detector circuit in this example. The time delay produces a phase difference between the input AC waveform at the input of the dimmer and input signal waveform 304 at the input of the zero-crossing detector circuit. The input signal waveform 304 is representative of the input AC waveform 302 but (in this example) a phase-shifted version of the input AC waveform 302. The phase shift, typically expressed in degrees, correlates directly to an amount of time that depends on the frequency of the AC waveform. Here, that amount of time is a time delay referred to herein as Ki. In other examples, no such delay exists or the delay is ignored and the input signal waveform 304 is taken as being the same as the input AC waveform in terms of voltage as a function of time.

As noted above, the zero-crossing detector circuit uses threshold voltage(s) to determine whether and when zero-crossings occur. Specifically, the zero-crossing detector circuit detects when voltage of the input signal waveform 304 transitions to/through a threshold voltage and provides an indication of that transition to the microcontroller. The microcontroller can regard the time that it receives that indication as being exactly when the transition in the output signal occurs and being indicative of a zero-crossing of that input signal waveform. The threshold voltage(s) are usually non-zero, for instance to account for the potential of the input signal to the zero-crossing detector circuit transitioning multiple times back-and-forth through 0V as the voltage waveform 304 transitions between a positive and a negative half-cycle. In the examples of FIG. 3A-3D, the zero-crossing detector circuit uses two voltage thresholds—a first voltage threshold used to determine when a positive-going zero-crossing occurs and a second voltage threshold used to determine when a negative-going zero-crossing occurs.

In the specific example of FIG. 3A, the first and second threshold voltages are positive voltages. The first threshold voltage 306 is used to detect the positive-going zero-crossings of the input signal waveform 304—that is, transitions in the input signal waveform from a negative (voltage) half-cycle into a following positive (voltage) half-cycle. The second threshold voltage 308 is used to detect the negative-going zero-crossings of the input signal waveform 304—that is, transitions in the input signal waveform from a positive half-cycle into a following negative half-cycle. In this example, the first and thresholds are different voltages, though they could be the same voltage in other examples.

On the positive-going zero-crossing that transitions at time Zp into positive half-cycle 305, and using a positive first threshold voltage, it is seen that there is difference in time between the time (Zp) of the positive-going zero-crossing of the input signal waveform 304 and the time (Tp) that the input signal waveform 304 transitions through the first threshold voltage and the output signal 320 discussed below switches state as discussed below. In this regard, the zero-crossing is reflected (at time Tp) to the zero-crossing detector circuit when the voltage of the input signal waveform 304 increases to the first threshold 306, at which time the zero-crossing detector circuit transitions state of its output signal 320 to enable the microcontroller to detect the zero-crossing. This occurs after the zero-crossing at time Zp actually occurred. The difference in time is a time offset represented herein as Kp. This time offset may be regarded as constant/unchanging across a number of cycles of the input signal waveform and/or could be measured, calculated, or updated as frequently as desired.

320 is a resulting output signal, as a square wave, from an output of the zero-crossing detector circuit to the microcontroller of the electrical load controller. It is shown below and aligned with waveforms 302 and 304 to depict the timing of the transitions of that output signal relative to the depicted waveforms 302, 304. Each transition in the output signal corresponds to a respective zero-crossing of the input signal waveform 304, which itself is indicative of a zero-crossing of the input AC waveform 302. Here, the state Hi and Low states of the output signal 320 correspond, respectively, to the positive and negative half-cycles of the input signal waveform 304 and input AC waveform 302.

When the voltage of the input signal waveform 304 transitions to/through a first threshold voltage 306, the zero-crossing detector circuit is configured to transition the state of output signal 320. Here, when the zero-crossing detector circuit detects at Tp the zero-crossing that occurred at Zp, the signal 320 goes Hi at time Tp to indicate the positive-going zero-crossing that previously occurred at time Zp. The transition 322 occurs delayed by the time offset Kp relative to the true time of the zero-crossing Zp of the input signal waveform 304.

On a negative-going zero-crossing, and using a positive second threshold voltage 308 as is the case of FIG. 3A, it is seen that the time (Tn) at which the input signal waveform 304 transitions through the second threshold voltage and the output signal 320 switches state occurs prior to the time (Zn) of the corresponding negative-going zero-crossing of the input signal waveform 304. In other words, the zero-crossing detector circuit detects the negative-going zero-crossing and transitions the output signal 320 just before the negative-going zero-crossing occurs at Zn. The difference in time is also a time offset and is represented herein as Kn. This time offset may be regarded as constant/unchanging across a number of cycles of the input signal waveform and/or could be measured, calculated, or updated as frequently as desired. Because the first and second threshold voltages have different magnitudes in this example, the time offsets Kp and Kn are of different duration. If the thresholds were of the same magnitude (and assuming the input signal waveform 304 is a true sine wave) then time offset Kp would be equal in duration to time offset Kn.

Output signal 320 goes Low at time Tn to indicate the negative-going zero-crossing that has yet to occur at time Zn. The transition 324 is thus premature by the amount of time Kn relative to the true time of the zero-crossing Zn of the input signal waveform 304.

Tp occurs after Zp and Tn occurs before Zn based on the threshold voltages 306, 308 used in this example. Therefore, output signal 320 is maintained in the Hi state (represented by plateau 326 between transitions 322 and 324) for a shorter duration of time (x1) than the length of time of the positive half-cycle 305 extending between Zp and Zn.

On the negative half-cycles of the input signal waveform 304, the positive first and second threshold voltages also have the effect that the transitions of the output signal 320 do not accurately reflect the timing of the true zero-crossings of the input signal waveform. On the negative-going zero-crossing at Zn to begin negative half-cycle 310, and as explained above, the output signal 320 transitions to the Low state at Tn before the negative-going zero-crossing at Zn occurs. At the end of the negative half-cycle 310, the indication of the positive-going zero-crossing is delayed with respect to the true time of that positive-going zero-crossing, just as was described above with respect to the positive-going zero-crossing into half-cycle 305. Consequently, output signal 320 transitions Low (324) prematurely, by time offset Kn, relative to the true time of the negative-going zero-crossing into half-cycle 310, and transitions Hi again (330) after the positive-going zero-crossing to end half-cycle 310 and begin the next positive half-cycle of input signal waveform 304. Output signal 320 is maintained in the Low state at 328 for a longer duration of time (x2) than the length of time of the negative half-cycle 310. Additionally, x1 is shorter in duration than x2 and reflects the asymmetry in the zero-crossing detector output signal discussed above. It is noted that this asymmetry would be present even if hysteresis is zero (same first and second threshold voltages), since the voltages are both positive in this example.

The features described with respect to positive and negative half-cycles 305, 310 are representative of subsequent cycles of the input AC waveform, input signal waveform, and output signal from the zero-crossing detector circuit. The microcontroller's processing to control dimmer operation continually relies on incoming indications of zero-crossings over time, usually for as long as the dimmer remains switched 'ON' to provide any power to the load. Tp, Zp, Tn, and Zn are discussed in terms of discrete points in time for purposes of explaining aspects of FIG. 3A, and specifically with respect to positive half-cycle 305 and negative half-cycle 310, but are more generically representative of the relevant points in time for each cycle.

If the microcontroller regards the times of the output signal transitions (e.g. 322, 324, 330, etc.) as the times of the true zero-crossings of the input AC waveform, then the timing of the microcontroller's switching power to the load may be improper. For instance, it may switch-on power to the load later than desired and switch-off power to the load earlier than is desired.

In one aspect that addresses the asymmetry in the zero-crossing detector circuit output, it is possible to model and/or empirically measure the time between actual zero-crossings of the input signal waveform 304 at the input of the zero-crossing detector circuit and the corresponding switching/transitions of the zero-crossing detector circuit output signal 320, i.e. measure the Kp and/or Kn time offsets. A given time offset will vary based on the specific frequency of the input signal waveform, which could vary in some applications. But since the slope of the incoming signal is at its maximum as it crosses through 0 V, then for a given nominal frequency range, such as 50-60 Hz, this variation may be minimal and could be treated as a constant if desired.

In another aspect, the phase difference between the input AC waveform (302) and the input signal waveform (304) could be modeled and/or empirically measured to determine the time offset Ki, which is the time shift between any given point on the input AC waveform 302 and a corresponding point on the input signal waveform 304 at the input to the zero-crossing detector circuit.

In accordance with aspects described herein, the microcontroller can determine times of the zero-crossings of the input AC waveform by applying corrections to the times of the transitions (Tps, Tns) that occur in the output signal from the output of the zero-crossing detector circuit to the microcontroller. The microcontroller receives the output signal in substantially real-time with negligible or no phase shift, detects the transition times of some or all transitions, and applies correction(s) to those times in order to determine the true times of the zero-crossings of the input AC waveform. The microcontroller can then use those true times of the zero-crossings of the input AC waveform to most accurately control the switching of the AC power to the load. The zero-crossing detector circuit could be configured to detect only the positive-going zero-crossings, only the negative-going zero-crossings, or both. Additionally or alternatively, the microcontroller could be configured to disregard or ignore indications of the positive-going zero-crossings or the negative-going zero-crossings, for instance by disregarding or ignoring the rising or falling transitions in the output signal from the zero-crossing detector-circuit. Additionally or alternatively, to the extent that the microcontroller registers the timings of any zero-crossing indications from the zero-crossing detector circuit, the microcontroller may be configured to use only some/all positive-going zero-crossings to control its switching, only some/all negative-going zero-crossings to control its switching, or both.

It is seen from FIG. 3A that when a positive threshold voltage is used to detect positive-going zero-crossings, the zero-crossing detector circuit output signal will switch/transition after the time (Zp) a positive-going zero crossing occurs at the input of the zero-crossing detector circuit, and if a positive threshold is used to detect negative-going zero-crossings, then the zero-crossing detector circuit output signal will switch/transition before the time (Zn) a negative-going zero-crossing (Zn) occurs at the input of the zero-crossing detector circuit.

Figure 3B:
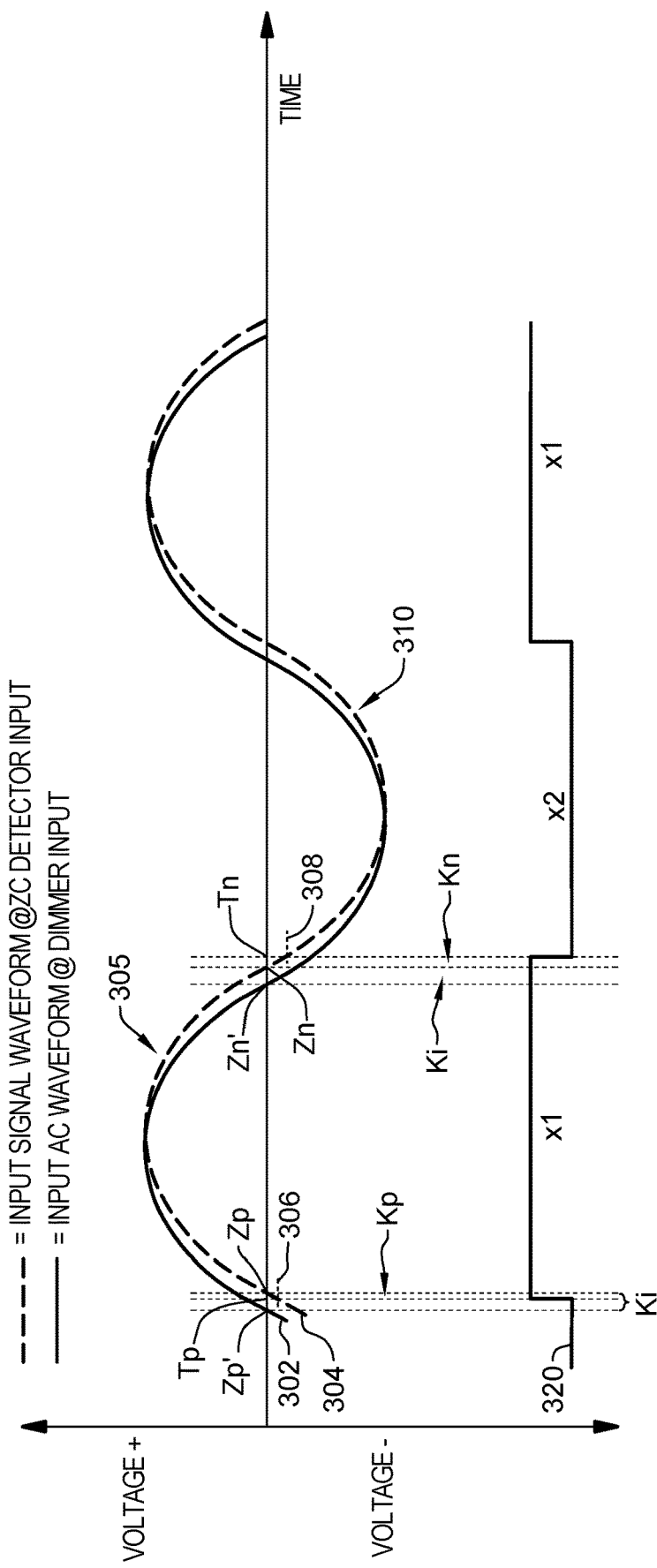
Figure 3C:
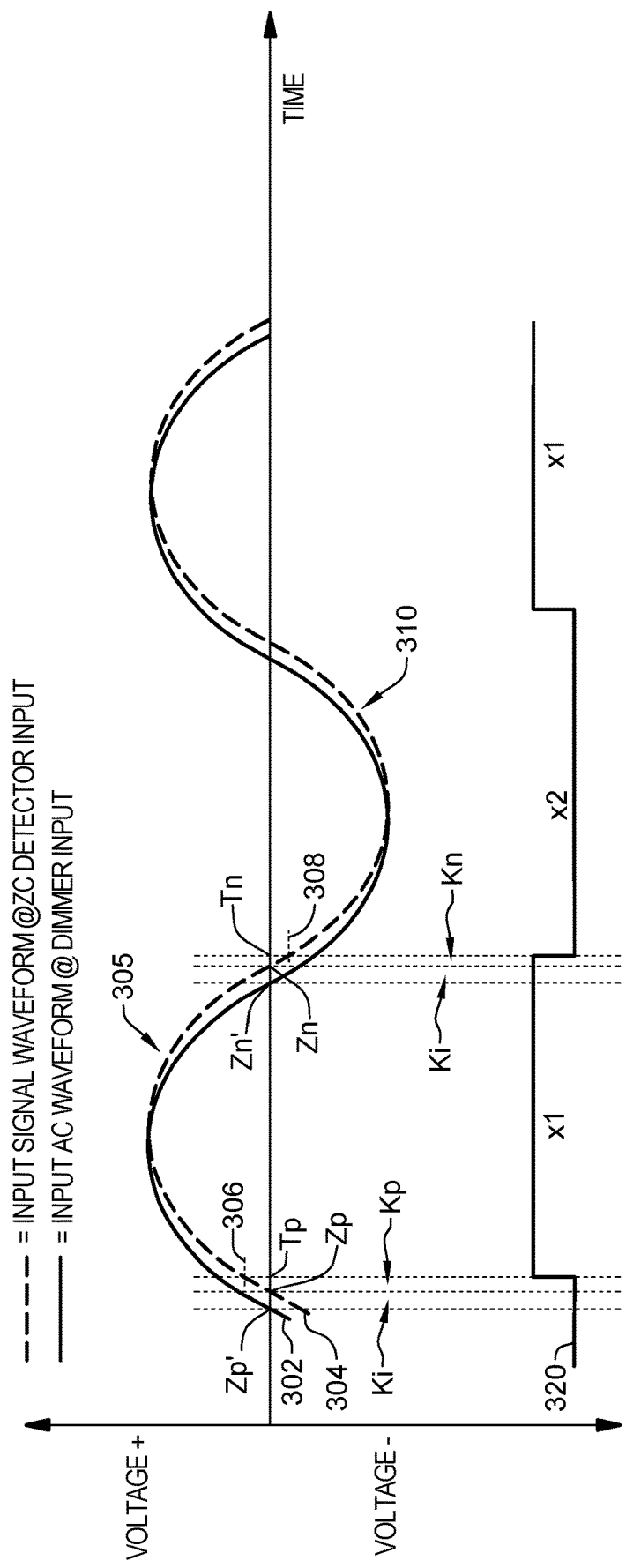
Figure 3D:
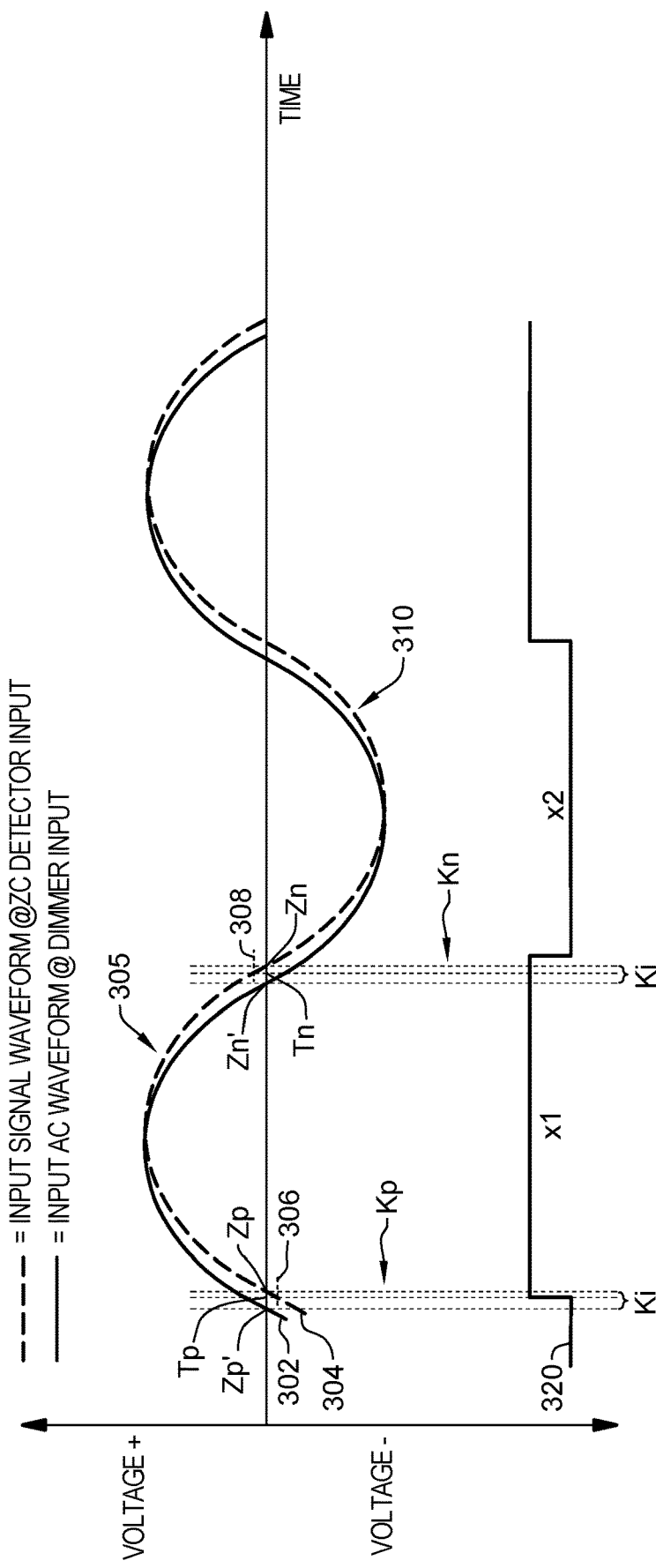

FIG. 3B depicts an example when negative threshold voltages are used in detecting both positive and negative-going zero-crossings of the input signal waveform at the input of the zero-crossing detector circuit. FIGS. 3B-3D include similar features to those shown in FIG. 3A with the exception that they use different voltage thresholds, which result in some different timings than those discussed above. For convenience, similar references to those used in FIG. 3A used in FIGS. 3B-3D and some references have been omitted. As shown in FIG. 3B, first threshold voltage 306 being negative results the zero-crossing detector circuit switching the output signal 320 at Tp, prior to the zero-crossing time Zp, by a time offset of Kp. The second threshold voltage 308 being negative results in the zero-crossing detector circuit switching the output signal 320 at Tn, after the zero-crossing time Zn, by a time offset of Kn. The duration of time (x1)

that the output signal 320 stays Hi to indicate the positive half-cycle 305 is longer than the duration of that positive half-cycle. Meanwhile, the zero-crossing detector circuit switches the output signal 320 before (by an amount of time equal to time offset Kp) the time of the zero-crossing at the end of the negative half-cycle 310, and therefore the duration of time (x2) that the output signal 320 stays Low to indicate the negative half-cycle 310 is shorter than the duration of that negative half-cycle 310 and shorter than x1, resulting in asymmetry in the output signal.

FIG. 3C depicts an example when the first threshold voltage 306 is positive and the second voltage threshold 308 is negative. This results in the zero-crossing detector circuit switching the output signal 320 at Tp, after the zero-crossing time Zp, by a time offset of Kp, and the zero-crossing detector circuit switching the output signal 320 at Tn, after the zero-crossing time Zn, by a time offset of Kn. The duration of time (x1) that the output signal 320 stays Hi to indicate the positive half-cycle 305 may be the same or different than the duration of that positive half-cycle depending on the magnitudes of the first and second threshold voltages, but in any case the transition times of the output signal 320 do not reflect the true times of the zero-crossings Zp and Zn. Meanwhile, the zero-crossing detector circuit switches the output signal 320 after (by an amount of time equal to time offset Kp) the time of the zero-crossing at the end of the negative half-cycle 310. The duration of time (x2) that the output signal 320 stays Low to indicate the negative half-cycle 310 may be the same or different from the duration of that negative half-cycle but in any case the transition times of the output signal 320 do not reflect the true times of the zero-crossings into and out of negative half-cycle 310. Whether x1 and x2 are the same duration, i.e. whether there is asymmetry in the output signal 320, depends on whether the magnitudes of the first and second threshold voltages are the same. If they are, i.e. the second threshold voltage is just the negative of the first threshold voltage, then the output signal 320 will accurately reflect the durations of the waveform cycles but with a phase difference.

FIG. 3D depicts an example when the first threshold voltage 306 is negative and the second voltage threshold 308 is positive. This is nearly the same as the scenario of FIG. 3C in which asymmetry in the output signal 320 may or may not result, but the transitions in state of the output signal 320 will not align with the true timing of the zero-crossings of the input signal waveform 304 at the input of the zero-crossing detector circuit. With a negative first threshold voltage 306 and positive second threshold voltage 308, the zero-crossing detector circuit switches the output signal 320 at Tp, before the zero-crossing time Zp, by a time offset of Kp, and the zero-crossing detector circuit switches the output signal 320 at Tn, before the zero-crossing time Zn, by a time offset of Kn but the transition times of the output signal 320 do not reflect the true times of the zero-crossings Zp and Zn. The zero-crossing detector circuit also switches the output signal 320 before (by an amount of time equal to time offset Kp) the time of the zero-crossing at the end of the negative half-cycle 310 but the transition times of the output signal 320 do not reflect the true times of the zero-crossings into and out of negative half-cycle 310.

In light of the above, the microcontroller can apply corrections to the times (Tps, Tns) that it observes the output signal transitioning one state to another. Specifically, the microcontroller can adjust the times (Tps, Tns) of the transitions using at least one time offset (e.g. Kp, Kn, or both) to produce zero-crossings times (Zps, Zns) of the input signal waveform to the zero-crossing detector circuit. In one embodiment, the microcontroller regards those adjusted Tp and Tn times to accurately reflect the times of the zero-crossing of the input AC waveform that is input to the electrical load controller. In embodiments, the microcontroller corrects just the Tp times (regardless whether the Tn times are used in controlling the dimmer), corrects just the Tn times (regardless whether the Tp times are used in controlling the dimmer), or corrects both the Tp and the Tn times. Additionally, in situations where Kp and Kn are assumed or measured to be equal and adjustments are made to both the Tp times and the Tn times, then a single offset could be used against each Tp and Tn, i.e. there is no distinguishing between the Kp and Kn offsets. Further, whether the adjustment adds or subtracts time (e.g. the amount of time corresponding to a time offset) depends on when the zero-crossing occurs relative to the transition time, which is based on whether the threshold voltage is positive or negative and which direction the waveform is heading, i.e. whether the zero-crossing is positive-going or negative-going.

For positive-going zero-crossings when using a positive voltage threshold, a zero-crossing time Zp is earlier than the detected corresponding transition time Tp, and therefore an adjustment to Tp reduces Tp by Kp to produce Zp, i.e. $Zp=Tp-Kp$. It is noted that such a 'backwards' adjustment of Tp be handled by signing the time offset Kp negative to represent a subtraction. If Kp is a negatively-signed time offset to reflect that the Kp time offset represents a delay such that Tp is delayed relative to Zp, then the equation would be written as $Zp=Tp+Kp$.

For positive-going zero-crossings and when using a negative voltage threshold, a zero-crossing time Zp is later than the detected corresponding transition time Tp, and therefore an adjustment to Tp increases Tp by Kp to produce Zp, i.e. $Zp=Tp+Kp$.

For negative-going zero-crossings and when using a positive voltage threshold, a zero-crossing time Zn is later than the detected corresponding transition time Tn, and therefore an adjustment to Tn increases Tn by Kn to produce Zn, i.e. $Zn=Tn+Kn$.

For negative-going zero-crossings and when using a negative voltage threshold, a zero-crossing time Zn is earlier than the detected corresponding transition time Tn, and therefore an adjustment to Tn reduces Tn by Kn to produce Zn, i.e. $Zn=Tn-Kn$. Here too the 'backwards' adjustment of Tn could be handled by signing the time offset Kn negative to represent a subtraction. If Kn is a negatively-signed time offset to reflect that the Kn time offset represents a delay and Tn is delayed relative to Zn, then the equation would be written as $Zn=Tn+Kn$.

In the above, a Tp transition time reflects the time at which the microcontroller recognizes the output signal transition (e.g. Low to Hi), which is effectively the time that the zero-crossing detector circuit detects and switches the output signal as a result of sensing a corresponding positive-going zero-crossing of the input signal waveform. A Tn transition time reflects the time at which the microcontroller recognizes the output signal transition (e.g. Hi to Low), which is effectively the time that the zero-crossing detector circuit detects and switches the output signal as a result of sensing a corresponding negative-going zero-crossing of the input signal waveform.

The corrections Kp, Kn discussed above will produce for the microcontroller the times of the zero-crossings of the input signal waveform (e.g. 304) at the input to the zero-crossing detector circuit. In this manner, the corrections correct for premature or delayed detection by the zero-crossing detector circuit of the zero-crossings of the input signal waveform 304. They do not account for any phase difference that might exist between the input AC waveform 302 at the line input terminal of the dimmer. This may be acceptable in some applications, for instance when there is no phase difference between the two waveforms 302 and 304, when the phase difference is negligible and the above corrections are sufficient to produce desirable switching of the load, or when other circuitry between the line input terminal and the zero-crossing detector circuit applies some additional phase shift that essentially corrects the waveforms back into an aligned phase. However, it may be desirable in some embodiments to apply another correction factor to account for such a phase difference between the input AC waveform 302 and the input signal waveform 304. In accordance with an additional aspect, another time offset Ki is determined, for instance modeled or empirically measured, to reflect the amount of time corresponding to the phase difference between the input AC waveform at the line input terminal and the input signal waveform at the input of the zero-crossing detector circuit. The adjustments that the microcontroller applies to the transition times can use the time offset(s) Kp and/or Kn discussed above, as well as the Ki time offset.

The Ki time offset if used represents a delay that exists in the input signal waveform reflecting the input AC waveform, and therefore can be used to correct the times reflected by the input signal waveform (e.g. Zp, Zn) into corresponding positive and negative zero-crossing times of the input AC waveform. An adjustment using Ki would therefore subtract the Ki time offset from the Tp or Tn time to produce the time of the true zero-crossing of the input AC waveform. Let Zp' represent the time of a positive-going zero-crossing of the input AC waveform, which is offset from Zp by Ki, and let Zn' represent the time of a negative-going zero-crossing, which is offset from Zn by Ki. The following present calculations for applying adjustments to transition times Tp and Tn using time offsets Kp, Kn, and Ki in varying threshold voltage different scenarios.

For positive-going zero-crossings and when using a positive voltage threshold, a zero-crossing time Zp' is determined by adjusting the time of the corresponding transition (Tp) to subtract both Kp and Ki, i.e. Zp'=Tp−Kp−Ki=Tp−(Kp+Ki). If the time offsets are signed to represent delays, then the equation would be written as Zp'=Tp+Kp+Ki.

For positive-going zero-crossings and when using a negative voltage threshold, the zero-crossing time Zp' is determined by adjusting the time of the transition (Tp) to add the Kp time offset and subtract the Ki time offset, i.e. Zp'=Tp+Kp−Ki. In the examples depicted herein, the Ki time offset is greater in duration than the Kp time offset so the effect of the adjustment is to subtract from the transition time Tp the difference between the Kp and Ki. For instance, if Kp is 2 units of time and Ki is 8 units of time, Tp would be reduced by 6 units of time. If instead the Ki time offset is lesser in duration (say 3 units of time) than the Kp time offset (say 5 units of time), the adjustment would add the difference between them (2 units of time) to the transition time Tp. If the time offsets are signed, then the equation would be written as Zp'=Tp+Kp+Ki.

For negative-going zero-crossings and when using a positive voltage threshold, the zero-crossing time Zn' is determined by adjusting the time of the transition (Tn) to add the Kn time offset and subtract the Ki time offset, i.e. Zn'=Tn+Kn−Ki. If the time offsets are signed, then the equation would be written as Zn'=Tn+Kn+Ki.

For negative-going zero-crossings and when using a negative voltage threshold, the zero-crossing time Zn' is determined by adjusting the time of the transition (Tn) to subtract Kn and Ki, i.e. Zn'=Tn−Kn−Ki=Tn−(Kn+Ki). If the time offsets are signed, then the equation would be written as Zn'=Tn+Kn+Ki.

In any of the foregoing, the adjustment to Tp or Tn could practically be made by performing an atomic operation that adds or subtracts, as appropriate, a net amount of time computed from the time offsets involved. For instance, Zp'=Tp+Kp−Ki could be computed by first determining the value of Kp−Ki and then making a single adjustment to Tp using that determined value.

The adjusted zero-crossing times Zp'/Zn' can be used to more accurately control the switching of the load because they reflect the true times of the input AC waveform zero-crossings more accurately than transition times Tp/Tn.

In some embodiments, a pulse width modulated (PWM) output from the microcontroller is used to control switching of the input AC power to the load by generating a single control pulse upon a transition of the zero-crossing detector circuit's output signal. The pulse delay (when the PWM output is Low for instance) and active time (when the PWM output is held Hi for instance) can be predetermined based on the desired switching (on/off) points relative to the input AC waveform. Since the zero-crossing detector circuit output signal (320) does not represent the true zero-crossings of the incoming AC waveform, the error correction factors Ki, Kp, and Kn discussed herein can be used as adjustments to the pulse delay and/or active time so that the load is switched at the proper time in relation to the incoming AC waveform.

Some applications require that the frequency of the incoming AC waveform be measured. Based on the measured frequency and a desired load level (power output) setting, a process of the microcontroller can determine the times that the load should be switched on and off relative to the zero-crossings of the input AC waveform in order to achieve the desired output. The switching is accomplished by selectively controlling a control signal to the switching circuit between an ON state, to fire the switching circuit, and an OFF state as described above and dim the load to the proper level. In forward phase dimming, this means delaying firing of the switching circuit for a set amount of time after the true zero-crossings. In reverse phase dimming, this means firing the switching circuit at or near the zero-crossing to begin a half-cycle and unlatching the switching circuit at a set time prior to the end of the half-cycle. Maintaining the same firing delay time in forward phase dimming, or set time prior to the end of the half-cycle for reverse phase dimming, when frequency varies across phases can result in differential levels of light output. Adjusting these times according, and responsive, to frequency changes can be advantageous.

In a particular example, it is desired to switch the load at precise phase angles of the incoming AC waveform despite variations in the frequency of the incoming AC waveform. This can be accomplished by using the frequency of the incoming AC waveform to convert the phase angles to times relative to the zero-crossings of the AC waveform. The frequency can be determined by calculating the difference in time between two consecutive zero-crossings if the zero crossing times have been corrected as described above.

An "input capture" feature of a microcontroller's timer subsystem could be used to capture time references of indicated zero-crossings, for instance by capturing the value of a free running counter/timer upon at each zero-crossing indication. Each tick or count of the counter could represent a set number of microseconds. The number of ticks between zero-crossing indications—the transitions in the output signal to the microcontroller—indicates the time between zero-crossings, from which frequency can be determined. The counter values in this example would represent the apparent time of each detected zero-crossing (input as seen by the microcontroller) which is delayed relative to the true zero-crossings of the input AC waveform as described above. The timings informed by the counter values could be corrected as described above and then used to calculate the frequency of the AC waveform and/or precise switch-firing times.

Some microcontrollers lack such an "input capture" capability but may provide the ability to measure the width of a pulse of the zero-crossing detector circuit output signal into the microcontroller. The pulse width of the zero-crossing detector circuit output signal can then be used to determine the frequency of the incoming AC waveform. The pulse can be treated as active in either the Hi state or the Low state. If the input signal is not a true, symmetrical square wave, as in the examples discussed above, the calculated pulse width (and hence the determined frequency of the input AV waveform) would be different depending on what level was considered the active level of the pulse. However, the correction factors Kp, Kn discussed herein can be used as adjustments to the measured pulse width in order to determine the true input AC waveform frequency. In a particular example, a plurality of pulse widths (i.e. the duration of time that each lasts) of the output signal can be measured, and then a function, such as a statistical function (average, mediate, etc.), of those durations can be taken to compute to determine an apparent time between two consecutive zero-crossings of the input signal waveform. The correction factors Kp, Kn and/or Ki can then be applied to that apparent time to provide an accurate representation of the time between two consecutive zero-crossings of the input signal waveform. That time informs the time of a half-cycle of the input AC waveform, which can then be doubled (i.e. to produce the time of a full-cycle) and inverted, e.g. as 1/(full-cycle time), to inform the frequency of the input AC waveform. By using the correction factors, the frequency can be determined accurately for either active state.

As an example, assume PW is the measured pulse width of the zero-crossing detector circuit output signal to the microcontroller and the zero-crossing detector circuit uses positive voltage thresholds to detect positive and negative-going zero-crossings as in FIG. 3A. If the Hi state of the zero-crossing detector circuit output signal is considered the active state of the pulse, the measured pulse width (PW) would be too short (see x1 in FIG. 3A). The correct pulse width would be PW+(Kp+Kn). If instead the Low state of the zero-crossing detector circuit output signal is considered the active state of the pulse, the measured pulse width would be too long (see x2 in FIG. 3A) and the correct pulse width would be PW−(Kp+Kn).

Accordingly, electrical load controllers for controlling conduction of a supply of alternating current (AC) power to a load and processes for operating such electrical load controllers are described herein. Such processes can be performed by one or more apparatuses, such as a dimmer or other electrical load controller as described herein. The electrical load controller can be for controlling conduction of a supply of AC power to an electrical load, such as a lighting load. The AC power can have an AC waveform that includes zero-crossings between positive and negative half-cycles of the input waveform. The electrical load controller can include a line input terminal and a load output terminal, the line input terminal configured to be electrically coupled to the supply of AC power and receive the input AC waveform thereof, and the load output terminal configured to be electrically coupled to the load. The electrical load controller can further include a switching circuit electrically coupled in series between the line input terminal and the load output terminal, and have an ON state in which the switching circuit conducts the supply of AC power to the load and an OFF state in which the switching circuit does not conduct the supply of AC power to the load. The switching circuit can therefore be configured to be selectively controlled by varying a control signal between an ON state, in which the switching circuit conducts the supply of AC power to the load, and an OFF state. The electrical load controller can further include a zero-crossing detector circuit that is configured to (i) receive an input signal waveform that is representative of the input AC waveform, and that is received at an input of the zero-crossing detector circuit, and (ii) output an output signal from an output of the zero-crossing detector circuit. Further, the electrical load controller can include a microcontroller that is configured to receive from the zero-crossing detector circuit the output signal therefrom and to perform a method/process for operating the electrical load controller.

Figure 4:
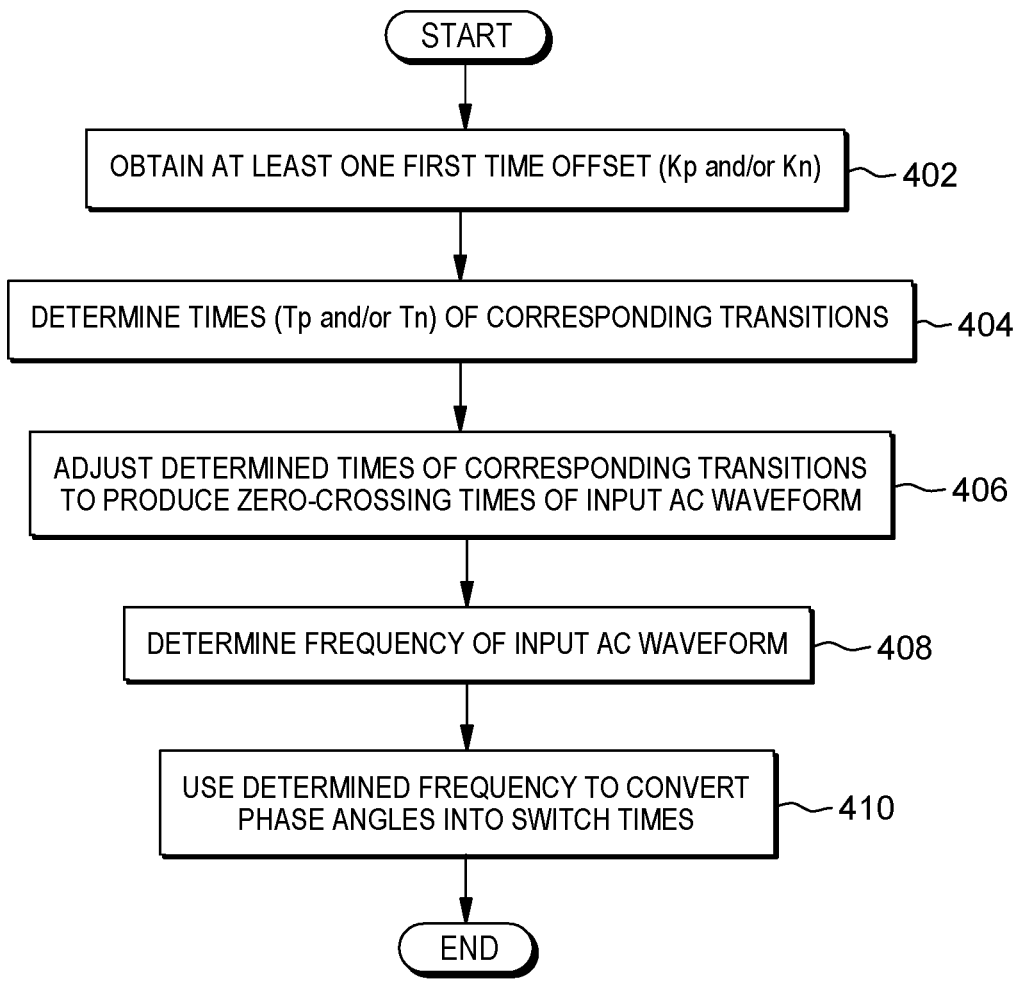
FIG. 4 depicts an example process for operating an electrical load controller for controlling conduction of a supply of alternating current (AC) power to a load, in accordance with aspects described herein.

FIG. 4 depicts an example such process for operating an electrical load controller to control conduction of a supply of alternating current (AC) power to a load. The process obtains (402) (determines, measures, calculates, retrieves, receives from memory or another source, etc.) at least one time offset (e.g. Kp and/or Kn). The at least one time offset represent amounts of time between (i) zero-crossings of an input signal waveform, representative of the input AC waveform, at an input of a zero-crossing detector circuit of the electrical load controller and (ii) corresponding transitions of an output signal from an output of the zero-crossing detector circuit to a microcontroller of the electrical load controller which senses the transitions (e.g. at times Tp and/or Tn). The time offset(s) might be measured, calculated, known, or otherwise predetermined. Each of the corresponding transitions corresponds to a respective zero-crossing of the zero-crossings of the input signal waveform and indicates a respective zero-crossing of the input AC waveform. At this point, the process of FIG. 4 undertakes steps to determine times of the zero-crossings of the input AC waveform. While the transitions times of the output signal from the zero-crossing detector circuit to the microcontroller indicate zero-crossings, those times do not necessarily align with the true times of the zero-crossings of the input AC waveform at the line input of the electrical load controller. Therefore, as part of determining the times of the zero-crossings of the input AC waveform, the process of FIG. 4 determines (404) the times of the corresponding transitions as detected by the microcontroller (e.g. determines the times of the Tps and the Tns for each of one or more full cycles of the input signal waveform), and then adjusts (406) those determined times of the corresponding transitions to produce the times of the zero-crossings of the input AC waveform. The adjusting (406) uses the at least one time offset (e.g. Kp and/or Kn).

Figure 5:
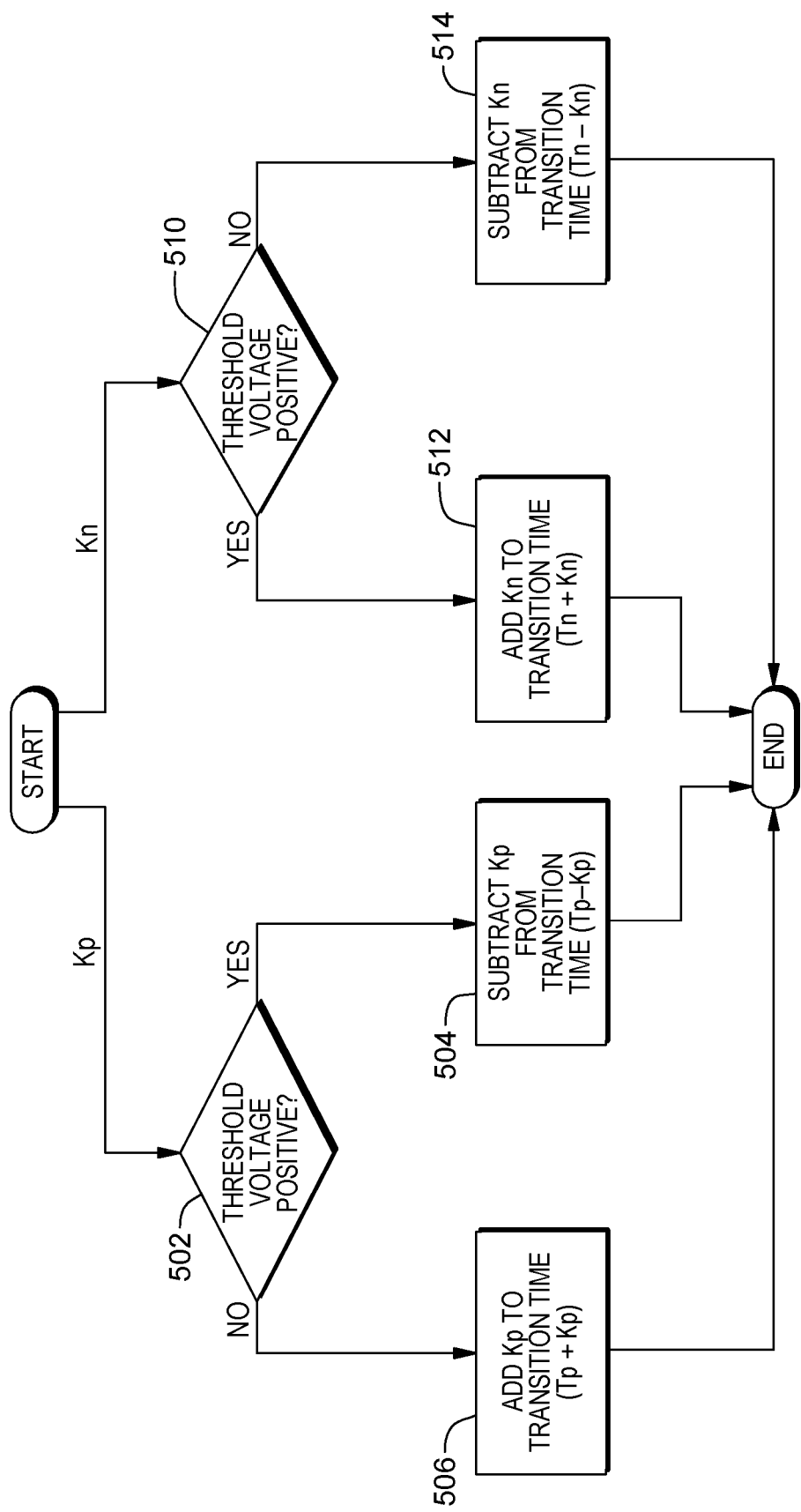
FIGS. 5 & 6 depicts examples processes for adjusting transition times of an output signal from a zero-crossing detector circuit in determining times of zero-crossings of an input AC waveform, in accordance with aspects described herein.

FIG. 5 depicts an example process for adjusting (406) transition times of the output signal from a zero-crossing detector circuit in determining the times of zero-crossings of an input AC waveform, in accordance with aspects described herein. FIG. 5 depicts example processing that can be used when determining positive-going zero-crossing times, negative-going zero-crossing times, or both.

For instance, the zero-crossings of the input AC waveform (the times of which are being determined/produced by the adjusting) can include positive-going zero-crossings of the input AC waveform. In this case, a time offset of the at least one time offset is a positive-going time offset (e.g. Kp). The zero-crossing detector circuit is configured to detect the positive-going zero-crossings of the input AC waveform based on voltage of the input signal waveform to the zero-crossing detector circuit transitioning through a threshold voltage. The positive-going time offset (Kp) therefore represents amounts of time between (i) zero-crossings of the input signal waveform indicative of the positive-going zero-crossings of the input AC waveform and (ii) a group of transitions of the corresponding transitions of the output signal from the output of the zero-crossing detector circuit. Namely, each transition of the group of transitions indicates a respective positive-going zero-crossing of the input AC waveform and Kp represents the amount of time between the time of that transition (detected as Tp) and the time (Zp) of that actual zero-crossing of the input signal waveform. In this scenario, adjusting (406) the determined times of the corresponding transitions to produce the times of the zero-crossings of the input AC waveform includes adjusting the determined times of the group of transitions using the positive-going time offset (Kp) to produce the times of the positive-going zero-crossings of the input AC waveform. Thus, referring to FIG. 5, the process follows the Kp branch to 502 where it determines whether the threshold voltage is positive. If the threshold voltage is positive (502, Y), then the process will, for each such determined transition time (Tp), adjust the transition time to subtract (504) from it an amount of time determined as a function of the positive-going time offset (Kp) to produce the time of the positive-going zero-crossing of the input AC waveform indicated by that transition. In some examples, the function is simply Kp itself, i.e. the time of the positive-going zero-crossing is Tp−Kp. In other examples, a more complex function, such as one including other term(s) such as Ki, is used.

If instead at 502 it is determined that the threshold voltage is not positive (502, N), i.e. it is negative, then the process adjusts the transition time Tp to add (506) an amount of time determined as a function of the positive-going time offset (Kp) to produce the time of the positive-going zero-crossing of the input AC waveform indicated by that transition. In some examples, the function is simply Kp itself, i.e. the time of the positive-going zero-crossing is Tp+Kp. In other examples, a more complex function, such as one including other term(s) such as Ki, is used.

FIG. 5 depicts example processing that can additionally or alternatively be used when determining negative-going zero-crossing times. For instance, the zero-crossings of the input AC waveform (the times of which are being determined) can include negative-going zero-crossings of the input AC waveform. In this case, a time offset of the at least one time offset is a negative-going time offset (e.g. Kn). The zero-crossing detector circuit is, as above, configured to detect the negative-going zero-crossings of the input AC waveform based on voltage of the input signal waveform transitioning through a threshold voltage (same or different as one used to detect positive-going zero-crossings, if such detection is being performed). The negative-going time offset (e.g. Kn) represents amounts of time between (i) zero-crossings of the input signal waveform indicative of the negative-going zero-crossings of the input AC waveform and (ii) a group of transitions of the corresponding transitions of the output signal from the output of the zero-crossing detector circuit. Namely, each transition of this group of transitions indicates a respective negative-going zero-crossing of the input AC waveform. In this scenario, adjusting (406) the determined times of the corresponding transitions to produce the times of the zero-crossings of the input AC waveform includes adjusting the determined times of the group of transitions using the negative-going time offset (Kn) to produce the times of the negative-going zero-crossings of the input AC waveform. Thus, referring to FIG. 5, the process follows the Kn branch to 510 where it determines whether the threshold voltage is positive. If the threshold voltage is positive (510, Y), then the process will, for each such determined transition time (Tn), adjust the transition time to add (512) an amount of time determined as a function of the negative-going time offset (Kn) to produce the time of the negative-going zero-crossing of the input AC waveform indicated by that transition. In some examples, the function is simply Kn itself, i.e. the time of the negative-going zero-crossing is Tn+Kn. In other examples, a more complex function, such as one including other term(s) such as Ki, is used.

If instead at 510 it is determined that the threshold voltage is not positive (510, N), i.e. it is negative, then the process adjusts Tn to subtract (514) an amount of time determined as a function of the negative-going time offset (Kn) to produce the time of the negative-going zero-crossing of the input AC waveform indicated by that transition. In some examples, the function is simply Kn itself, i.e. the time of the negative-going zero-crossing is Tn−Kn. In other examples, a more complex function, such as one including other term(s) such as Ki, is used.

In situations when the zero-crossings of the input AC waveform (the times of which are being determined) include positive-going zero-crossings of the input AC waveform as well as negative-going zero-crossings of the input AC waveform, then the at least one time offset includes two time offsets, Kp and Kn and both branches (Kp, Kn) in FIG. 5 can be utilized in adjusting the appropriate transition times (Tps, Tns) to arrive at the respective zero-crossing times of the input AC waveform. Specifically, the zero-crossing detector circuit is configured to detect the positive-going zero-crossings of the input AC waveform based on voltage of the input signal waveform transitioning through a first threshold voltage and to detect the negative-going zero-crossings of the input AC waveform based on voltage of the input signal waveform transitioning through a second threshold voltage. In this case, the at least one time offset includes at least two time offsets: a positive-going time offset (e.g. Kp) that represents amounts of time between (i) zero-crossings of the input signal waveform indicative of the positive-going zero-crossings of the input AC waveform and (ii) a first group of transitions of the corresponding transitions of the output signal from the output of the zero-crossing detector circuit, and a negative-going time offset (e.g. Kn) that represents amounts of time between (i) zero-crossings of the input signal waveform indicative of the negative-going zero-crossings of the input AC waveform and (ii) a second group of transitions of the corresponding transitions of the output signal from the output of the zero-crossing detector circuit. The first threshold voltage can be different from the second threshold voltage and the positive-going time offset can be different from the negative-going time offset.

Each transition of the first group of transitions indicates a respective positive-going zero-crossing of the input AC waveform, and each transition of the second group of transitions indicates a respective negative-going zero-crossing of the input AC waveform. In this scenario, adjusting (406) the determined times of the corresponding transitions includes adjusting both the determined times of the first group of transitions (Tps) using the positive-going time offset (Kp) to produce the times of the positive-going zero-crossings of the input AC waveform and the determined times of the second group of transitions (Tns) using the negative-going time offset (Kn) to produce the times of the negative-going zero-crossings of the input AC waveform.

In adjusting the determined times of the first group of transitions, and referring to FIG. 5, the process follows the Kp branch as described above. In adjusting the determined times of the second group of transitions, the process follows the Kn branch as described above.

In some embodiments, the process of FIG. 4 accounts for any phase difference that might exist between the input AC waveform at the line input terminal and the input signal waveform at the input of the zero-crossing detector circuit. For instance, the electrical load controller might include electrical circuitry disposed between the line input terminal and the input of the zero-crossing detector circuit, where that electrical circuitry imparts a time delay in the electrical conduction of the input AC waveform to the input of the zero-crossing detector circuit. Such time delay could produce a phase difference between the input AC waveform and the input signal waveform at the input of the zero-crossing detector circuit. In these situations, the at least one time offset is at least one first time offset (e.g. Kp and/or Kn) and the process also obtains a second time offset (Ki) that is an amount of time (e.g. the time delay) corresponding to the phase difference between the input AC waveform at the line input terminal and the input signal waveform at the input of the zero-crossing detector circuit. The adjusting (406) of the determined times of the corresponding transitions uses in this example both at least one first time offset and also the second time offset to adjust the transition times, and discussed with reference to FIG. 6.

Figure 6:
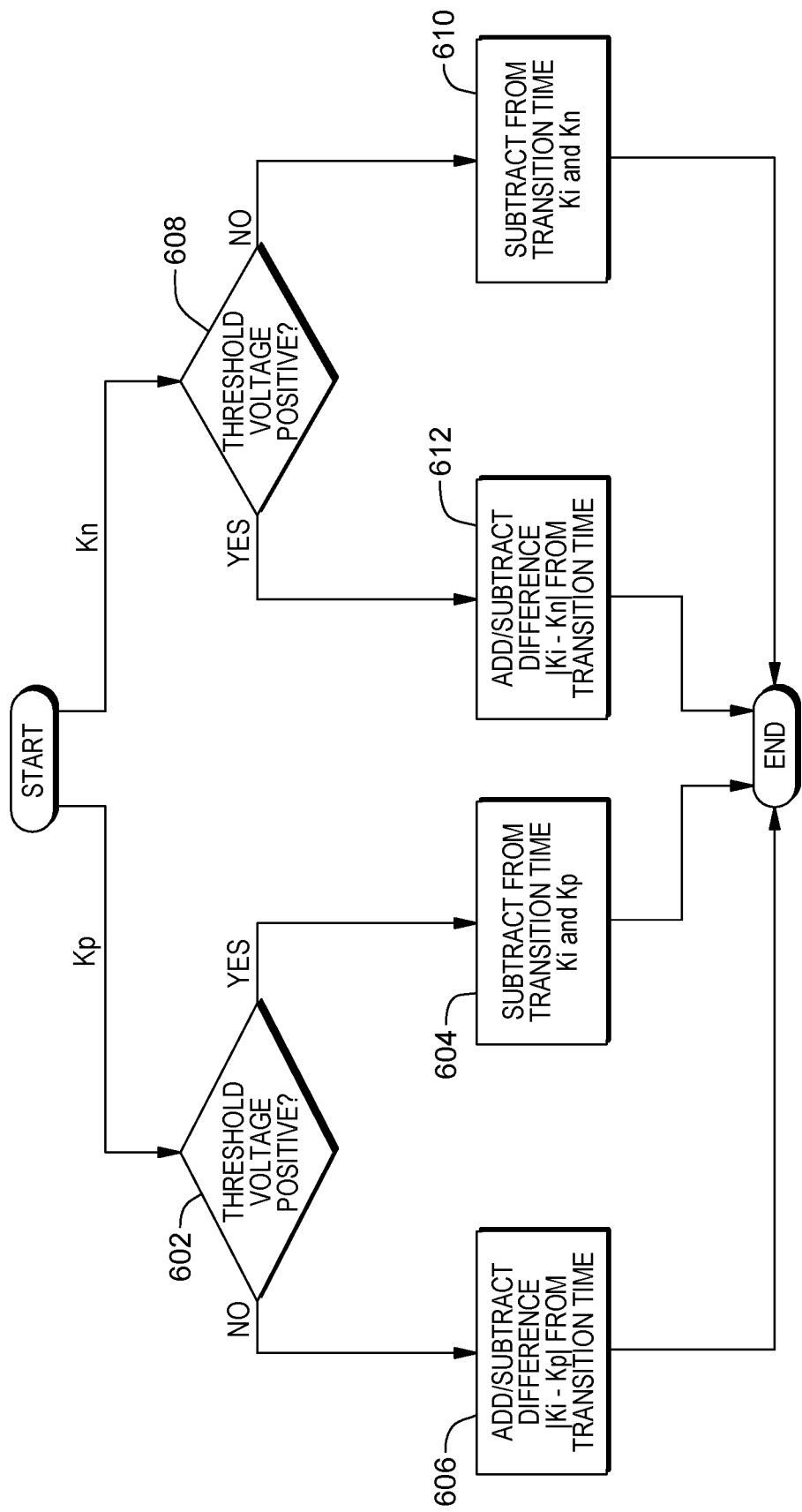

FIG. 6 depicts an example process for adjusting transition times of an output signal from a zero-crossing detector circuit in determining times of zero-crossings of an input AC waveform, in accordance with aspects described herein, in particular when dealing with a phase difference time offset (Ki).

In a scenario, the zero-crossings of the input AC waveform (the times of which are being determined) include positive-going zero-crossings of the input AC waveform and the zero-crossing detector circuit is configured to detect the positive-going zero-crossings of the input AC waveform based on voltage of the input signal waveform transitioning through a threshold voltage. A time offset of the at least one first time offset is a positive-going time offset (Kp) representing amounts of time between (i) zero-crossings of the input signal waveform indicative of the positive-going zero-crossings of the input AC waveform and (ii) a group of transitions of the corresponding transitions of the output signal from the output of the zero-crossing detector circuit, each transition of the group of transitions indicating a respective positive-going zero-crossing of the input AC waveform. The adjusting (406) the determined times of the corresponding transitions to produce the times of the zero-crossings of the input AC waveform includes then adjusting the determined times of the group of transitions (Tps) using the positive-going time offset (Kp) and the second time offset (Ki) to produce the times of the positive-going zero-crossings of the input AC waveform. Referring to FIG. 6, the process follows the Kp branch to 602 where it determines whether the threshold voltage is positive. If the threshold voltage is positive (602, Y), then the process will, for each such determined transition time (Tp), adjust the time Tp to subtract (604) an amount of time determined as a function of the positive-going time offset (Kp) and the second time offset (Ki) to produce the time of the positive-going zero-crossing of the input AC waveform indicated by that transition. In some examples, the function is Kp+Ki, meaning both Kp and Ki are subtracted, though in other examples a more complex function, such as one including other term(s), is used.

If instead at 602 it is determined that the threshold voltage is not positive (602, N), i.e. it is negative, then the process adjusts the transition time by an amount of time determined as a function of, such as the difference between, the positive-going time offset (Kp) and the second time offset (Ki) to produce the time of the positive-going zero-crossing of the input AC waveform indicated by that transition. In some examples, the function adds the positive-going time offset (Kp) and subtracts the second time offset (Ki). The time of the positive-going zero-crossing Zp' would therefore be Tp−Ki+Kp. In other examples, a more complex function, such as one including other term(s), is used. It is noted that when Ki is larger than Kp, the effect is to subtract the difference between Kp and Ki from Tp. If instead Ki were a shorter amount of time than Kp, the difference between Kp and Ki (Kp-Ki) would instead be added to Tp in order to determine the time of the true zero-crossing.

In another scenario, the zero-crossings of the input AC waveform (the times of which are being determined) include negative-going zero-crossings of the input AC waveform and the zero-crossing detector circuit is configured to detect the negative-going zero-crossings of the input AC waveform based on voltage of the input signal waveform transitioning through a threshold voltage. A time offset of the at least one first time offset is a negative-going time offset representing amounts of time between (i) zero-crossings of the input signal waveform indicative of the negative-going zero-crossings of the input AC waveform and (ii) a group of transitions of the corresponding transitions of the output signal from the output of the zero-crossing detector circuit, each transition of the group of transitions indicating a respective negative-going zero-crossing of the input AC waveform. The adjusting (406) the determined times of the corresponding transitions to produce the times of the zero-crossings of the input AC waveform includes then adjusting the determined times of the group of transitions (Tns) using the negative-going time offset (Kn) and the second time offset (Ki) to produce the times of the negative-going zero-crossings of the input AC waveform. Referring still to FIG. 6, the process follows the Kn branch to 608 where it determines whether the threshold voltage is positive. If the threshold voltage is not positive (608, N), i.e. it is negative, then then the process will, for each such determined transition time (Tn), adjust the transition time to subtract (610) an amount of time determined as a function of the negative-going time offset (Kn) and the second time offset (Ki) to produce the time of the negative-going zero-crossing of the input AC waveform indicated by that transition. In some examples, the function is Kn+Ki, meaning both Kn and Ki are subtracted, though in other examples a more complex function, such as one including other term(s), is used.

If instead at 608 it is determined that the threshold voltage is positive (608, Y), then the process adjust the transition time Tn subtracts (612) from the determined time of the transition (Tn) an amount of time determined as a function of, such as the difference between, the negative-going time offset (Kn) and the second time offset (Ki) to produce the time of the negative-going zero-crossing of the input AC waveform indicated by that transition. In some examples, the function adds the negative-going time offset and subtracts the second time offset. The time of the negative-going zero-crossing Zn' would therefore be Tn−Ki+Kn. In other examples, a more complex function, such as one including other term(s), is used. It is noted that when Ki is larger than Kn, the effect is to subtract the difference between Kn and Ki from Tn. If instead Ki were a shorter amount of time than Kn, the difference between Kn and Ki (Kn−Ki|) would instead be added to Tn in order to determine the time of the true zero-crossing.

In yet another scenario, the zero-crossings of the input AC waveform (the times of which are being determined) include both positive-going zero-crossings of the input AC waveform and negative-going zero-crossings of the AC waveform. In this case, the zero-crossing detector circuit is configured to detect the positive-going zero-crossings of the input AC waveform based on voltage of the input signal waveform transitioning through a first threshold voltage and the zero-crossing detector circuit is configured to detect the negative-going zero-crossings of the input AC waveform based on voltage of the input signal waveform transitioning through a second threshold voltage. The at least one first time offset therefore include a positive-going time offset (Kp) representing amounts of time between (i) zero-crossings of the input signal waveform indicative of the positive-going zero-crossings of the input AC waveform and (ii) a first group of transitions (Tps) of the corresponding transitions of the output signal from the output of the zero-crossing detector circuit, with each transition of the first group of transitions indicating a respective positive-going zero-crossing of the input AC waveform, and a negative-going time offset (Kn) representing amounts of time between (i) zero-crossings of the input signal waveform indicative of the negative-going zero-crossings of the input AC waveform and (ii) a second group of transitions (Tns) of the corresponding transitions of the output signal from the output of the zero-crossing detector circuit, with each transition of the second group of transitions indicating a respective negative-going zero-crossing of the input AC waveform. The first and second threshold voltages used to detect zero-crossings could be the same of different voltages, and therefore the resulting positive-going time offset (Kp) could be different from the negative-going time offset (Kn).

In this scenario, adjusting (406) the determined times of the corresponding transitions includes adjusting both the determined times of the first group of transitions (Tps) using the positive-going time offset (Kp) and the second time offset (Ki) to produce the times of the positive-going zero-crossings of the input AC waveform and also adjusting the determined times of the second group of transitions (Tns) using the negative-going time offset (Kn) and the second time offset (Ki) to produce the times of the negative-going zero-crossings of the input AC waveform.

In adjusting the determined times of the first group of transitions (Tps), and referring to FIG. 6, the process follows the Kp branch as described above and in adjusting the determined times of the second group of transitions (Tns) the process follows the Kn branch as described above.

It is noted that the above processing using Ki could be performed regardless whether Ki is non-zero. In other words, there may or may not be an actual phase delay but a system, such as an electrical load controller, could be configured to use Ki as described above without regard to whether its value e.g. regardless whether Ki=0.

Returning to FIG. 4, the adjustment (406) produces the times of the zero-crossings of the input AC waveform. This may be sufficient for purposes of operating the electrical load controller, for instance firing the switching circuit at desired times relative to the true zero-crossings. Optionally, the process continues by determining (408) a frequency of the input AC waveform using the determined times of the zero-crossings of the input AC waveform. It is straightforward to determine the frequency of a waveform when the zero-crossing times are known. In addition to optionally determining the frequency of the input AC waveform, the process can also use (410) the determined frequency to convert phase angles, at which the conduction of the supply of AC power to the load is to be switched, into times at which to switch a switching circuit electrically coupled in series between the line input terminal and a load output terminal of the electrical load controller in order to control power to the load.

Figure 7:
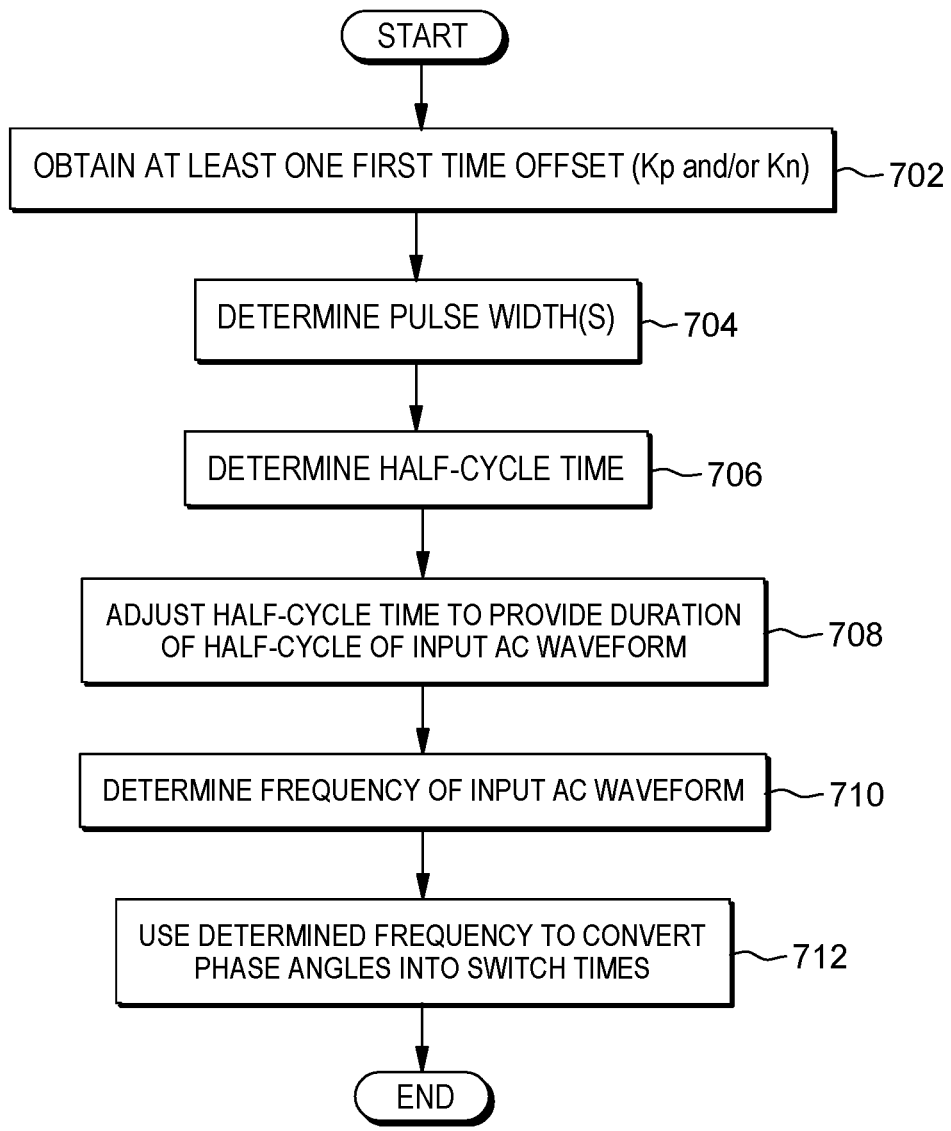
FIG. 7 depicts another example process for operating an electrical load controller for controlling conduction of a supply of alternating current (AC) power to a load, in accordance with aspects described herein.

In another aspect disclosed herein, a method of operating an electrical load controller for controlling conduction of a supply of AC power to a load is provided that uses adjustments to a pulse width to determine input AC waveform frequency. This method can be used with electrical load controllers as described herein. The zero-crossing detector circuit is configured to output an output signal that includes 'pulses' during each of which the output signal remains in an active state (either Hi or Low). The microcontroller is configured to receive from the zero-crossing detector circuit the output signal therefrom and to perform a method as presented by FIG. 7. In FIG. 7, the process obtains (702) at least one time offset (e.g. Kn and/or Kp). The time offset(s) represent amounts of time between (i) zero-crossings of the input signal waveform at the input of the zero-crossing detector circuit and (ii) corresponding transitions of the output signal from the output of the zero-crossing detector circuit to the microcontroller, each of the corresponding transitions corresponding to a respective zero-crossing of the zero-crossings of the input signal waveform and indicating a respective zero-crossing of the input AC waveform. The process determines (704) one or more pulse widths of a corresponding one or more pulses of the plurality of pulses, with each pulse width of the one or more pulse widths indicating timing between a respective pair of consecutive zero-crossings of the input signal waveform. A pulse is defined when the output signal transitions from a first state to a second state for some duration of time and then back to the first state. The pulse duration is defined as the length of time from (i) when the output signal transitions into the first state from the second state to (ii) when the output signal transitions back into the first state from the second state. It is noted, however, that in some cases a 'transition' from a source state to a target state might encompass a group of transitions that occur back and forth between the source and target states in a relatively short amount of time before the output signal ultimately remains in the target state. In this situation, the 'time of the transition' between the two states can be taken as some function of the group of transitions, for instance the time of the first transition of the group, the time of the last transition of the group, or a time midway between the time of the first and time of the last transitions, as examples.

In any case, the process determines (706) a half-cycle time corresponding to the one or more pulse widths, the half-cycle time representing duration of half-cycles of the input signal waveform. In one embodiment, determining the half-cycle time determines a duration of a (i.e. one) pulse width of the one or more pulse widths and uses the duration of that pulse width as the half-cycle time. This is a simplistic approach. In a more complex approach, the one or more pulse widths include a plurality of pulse widths having a plurality of durations, and determining the half-cycle time includes determining an average of those plurality of durations and taking that average as the determined half-cycle time.

The half-cycle time is therefore some duration of time representative of the time is takes for a half-cycle of the input signal waveform to complete. However, the times are based on transition times of the output signal of the zero-crossing detector circuit and as explained above the transitions times occur before or after the true zero-crossing times of the input signal waveform at the input of the zero-crossing detector on account of threshold voltages being used to inform when those transitions are to occur. Thus, the process adjusts (708) that half-cycle time using the at least one time offset (Kp and/or Kn) to provide a true duration of half-cycles of the input AC waveform. The adjustment is to account for differences in time between actual zero-crossings of the input signal waveform and the time when the input signal waveform voltage rises or falls to the threshold level.

Based on the adjusting (708), the process then determines (710) a frequency of the input AC waveform using the adjusted half-cycle time. In one example, determining the frequency includes doubling the adjusted half-cycle time. Optionally, as shown in FIG. 7, the process then uses (712) the determined frequency to convert phase angles, at which the conduction of the supply of AC power to the load is to be switched, into times at which to switch the switching circuit in order to control power to the load.

The zero-crossings of the input AC waveform can include positive-going zero-crossings of the input AC waveform, and a time offset of the at least one time offset is a positive-going time offset representing amounts of time between (i) zero-crossings of the input signal waveform indicative of the positive-going zero-crossings of the input AC waveform and (ii) a group of transitions of the corresponding transitions of the output signal from the output of the zero-crossing detector circuit. Each transition of the group of transitions indicates a respective positive-going zero-crossing of the input AC waveform. The adjusting (708) the half-cycle time thus includes adding the positive-going time offset to, or subtracting the positive-going time offset from, the determined half-cycle time. Whether this positive-going time offset is added or subtracted is based on whether the voltage threshold is positive or negative and whether the active state (i.e. the pulses) are representing positive or negative voltage half-cycles. In other words, whether to add or subtract the positive-going time offset is based on whether the half-cycle time stretches to just before or just after the positive-going zero crossing. The positive-going time offset is to be either added to or removed from the half-cycle time. In the example of FIG. 3A for instance, pulse 326 is representative of the positive half-cycle between Zp and Zn. The pulse is shorter in duration than the time between Zp and Zn. It does not stretch to Zp (or Zn) because the voltage threshold to detect the positive-going zero-crossing Zp is positive in that example. The Kp time offset would need to be added to the pulse duration x1—the apparent half-cycle time. If instead the voltage threshold being used were negative (as in FIG. 3B) or the active state/pulses being observed and measured were the output signal in the Low state, then the Kp time offset would be subtracted from the pulse duration—the apparent half-cycle time.

Similarly, the zero-crossings of the input AC waveform can include negative-going zero-crossings of the input AC waveform, and a time offset of the at least one time offset is a negative-going time offset representing amounts of time between (i) zero-crossings of the input signal waveform indicative of the negative-going zero-crossings of the input AC waveform and (ii) a group of transitions of the corresponding transitions of the output signal from the output of the zero-crossing detector circuit. Each such transition of the group of transitions indicates a respective negative-going zero-crossing of the input AC waveform, and the adjusting (708) the half-cycle time includes adding the negative-going time offset (Kn) to, or subtracting the negative-going time offset (Kn) from, the determined half-cycle time. Whether this negative-going time offset is added or subtracted is again based on whether the voltage threshold is positive or negative and whether the active state (i.e. the pulses) are representing positive or negative voltage half-cycles. In other words, whether to add or subtract the negative-going time offset is based on whether the half-cycle time stretches to just before or just after the negative-going zero crossing. It needs to be either added to or removed from the half-cycle time.

In embodiments, both Kp and Kn are used to adjust the determined half-cycle time. Adjusting the half-cycle time includes determining an adjustment amount of time as a function of the positive-going time offset and the negative-going time offset, and either adding the adjustment amount of time to, or subtracting the adjustment amount of time from, the determined half-cycle time. For instance, in FIG. 3A, both Kp and Kn are added to the determined half-cycle time (x1) because the active state is the Hi state indicating a positive half-cycle and the use of positive threshold voltages for both positive and negative-going zero-crossings means that the half-cycle time (x1) is short by both Kp and Kn. The adjusted half-cycle time would therefore be the determined half-cycle time (x1)+Kp+Kn. In contrast, FIG. 3C shows when the determined half-cycle time (x1) is short by Kp because of the positive voltage threshold used for the positive-going zero-crossing but long by Kn because of the negative voltage threshold used for the negative-going zero-crossing. In this case, the adjusted half-cycle time is determined as the half-cycle time (x1)+Kp−Kn. It is noted in this regard that if Kn=Kp, then the determined half-cycle time x1 would happen to accurately reflect the time between Zp and Zn, and therefore the adjustment in 708 would be a net zero adjustment.

Although various examples are provided, variations are possible without departing from a spirit of the claimed aspects.

Figure 8:
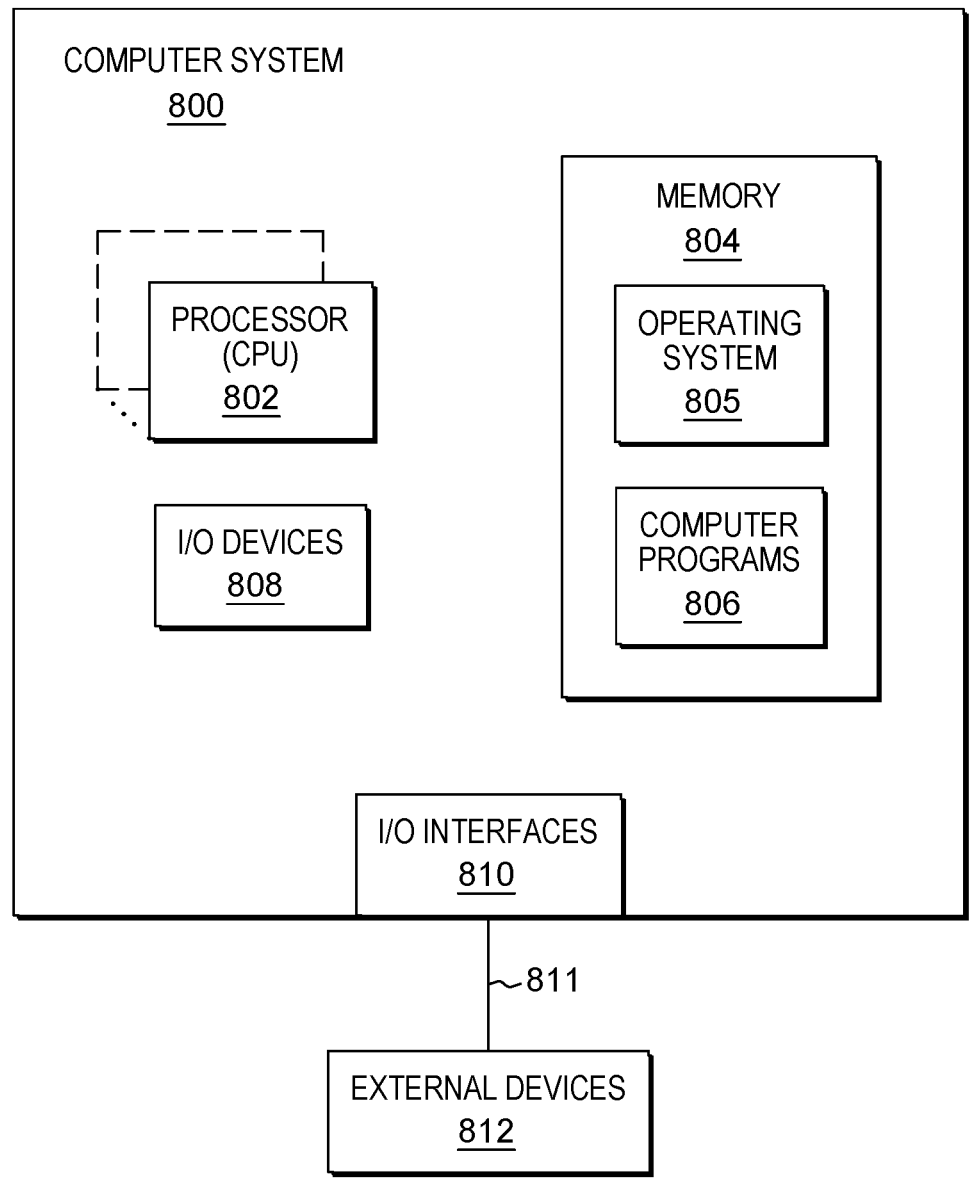
FIG. 8 depicts one example of a computer system and associated devices to incorporate and/or use aspects described herein.

Systems described herein, including those referred to herein as dimmers/electrical load controllers, may be regarded in some respects as a computer system capable of executing program instructions to perform processes/methods. Thus, processes as described herein may be performed by one or more computer systems, such as those described herein, which may include one or more dimmers/dimming systems and/or one or more computer systems of or connected thereto, such as one or more cloud servers, one or more embedded computers, and/or one or more other computer systems. FIG. 8 depicts one example of a computer system and associated devices to incorporate and/or use aspects described herein. A computer system may also be referred to herein as a data processing device/system, computing device/system/node, or simply a computer. The computer system may be based on one or more of various system architectures and/or instruction set architectures.

FIG. 8 shows a computer system 800 in communication with external device(s) 812. Computer system 800 includes one or more processor(s) 802, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 802 can also include register(s) to be used by one or more of the functional components. Computer system 800 also includes memory 804, input/output (I/O) devices 808, and I/O interfaces 810, which may be coupled to processor(s) 802 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 804 can be or include main or system memory (e.g. Random Access Memory) used in the execution of program instructions, storage device(s) such as hard drive(s), flash media, or optical media as examples, and/or cache memory, as examples. Memory 804 can include, for instance, a cache, such as a shared cache, which may be coupled to local caches (examples include L1 cache, L2 cache, etc.) of processor(s) 802. Additionally, memory 804 may be or include at least one computer program product having a set (e.g., at least one) of program modules, instructions, code or the like that is/are configured to carry out functions of embodiments described herein when executed by one or more processors.

Memory 804 can store an operating system 805 and other computer programs 806, such as one or more computer programs/applications that execute to perform aspects described herein. Specifically, programs/applications can include computer readable program instructions that may be configured to carry out functions of embodiments of aspects described herein.

Examples of I/O devices 808 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (812) coupled to the computer system through one or more I/O interfaces 810.

Computer system 800 may communicate with one or more external devices 812 via one or more I/O interfaces 810. Example external devices include a keyboard, a pointing device, a display, and/or any other devices that enable a user to interact with computer system 800. Other example external devices include any device that enables computer system 800 to communicate with one or more other computing systems or peripheral devices such as a printer. A network interface/adapter is an example I/O interface that enables computer system 800 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 810 and external devices 812 can occur across wired and/or wireless communications link(s) 811, such as Ethernet-based wired or wireless connections. Example wireless connections include cellular, Wi-Fi, Bluetooth®, proximity-based, near-field, or other types of wireless connections. More generally, communications link(s) 811 may be any appropriate wireless and/or wired communication link(s) for communicating data.

Particular external device(s) 812 may include one or more data storage devices, which may store one or more programs, one or more computer readable program instructions, and/or data, etc. Computer system 800 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 800 may be operational with numerous other general purpose or special purpose computing system environments or configurations. Computer system 800 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects described herein may be a system, a method, and/or a computer program product, any of which may be configured to perform or facilitate aspects described herein.

In some embodiments, aspects may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner Such program instructions for carrying out operations to perform, achieve, or facilitate aspects described herein may be written in, or compiled from code written in, any desired programming language. In some embodiments, such programming language includes object-oriented and/or procedural programming languages such as C, C++, C #, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects described herein, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of operating an electrical load controller for controlling conduction of a supply of alternating current (AC) power to a load, the supply of AC power having an input AC waveform that is input to the electrical load controller at a line input terminal of the electrical load controller, the input AC waveform comprising zero-crossings between positive and negative half-cycles of the input AC waveform, the method comprising:
   obtaining a time offset, the time offset representing an amount of time between:
      (i) a zero-crossing of an input signal waveform, representative of the input AC waveform, at an input of a zero-crossing detector circuit of the electrical load controller; and
      (ii) a corresponding detected transition of an output signal from an output of the zero-crossing detector circuit to a microcontroller of the electrical load controller, the detected transition corresponding to a zero-crossing of the zero-crossings of the input signal waveform and indicating a zero-crossing of the input AC waveform; and
   determining an actual time of the zero-crossing of the input AC waveform, comprising:
      determining a time of the corresponding detected transition; and
      adjusting the determined time of the corresponding detected transition to produce the time of the zero-crossing of the input AC waveform, wherein the adjusting uses the time offset.

2. The method of claim 1, further comprising repeating the method to determine actual times of zero-crossings of a plurality of zero-crossings of the input AC waveform.

3. The method of claim 2, wherein the adjusting the determined times of the corresponding detected transitions uses the time offset in adjusting each of the determined times.

4. The method of claim 2, further comprising, as part of the repeating, obtaining the time offset one or more times to obtain one or more other time offsets, the one or more other time offsets being used in adjusting at least some of the determined times of the corresponding detected transitions.

5. The method of claim 2, wherein the zero-crossings of the input AC waveform comprise positive-going zero-crossings of the input AC waveform and negative-going zero-crossings of the AC waveform.

6. The method of claim 5, wherein the adjusting the determined times of the corresponding detected transitions comprises:
   using a positive-going time offset, representing amounts of time between (i) zero-crossings of the input signal waveform indicative of the positive-going zero-crossings of the input AC waveform and (ii) a first group of detected transitions of the corresponding detected transitions, each transition of the first group of detected transitions indicating a respective positive-going zero-crossing of the input AC waveform; and
   using a negative-going time offset representing amounts of time between (i) zero-crossings of the input signal waveform indicative of the negative-going zero-crossings of the input AC waveform and (ii) a second group of detected transitions of the corresponding detected transitions, each transition of the second group of detected transitions indicating a respective negative-going zero-crossing of the input AC waveform; and
   wherein the obtained time offset is used as at least one of the positive-going time offset and the negative-going time offset.

7. The method of claim 6, wherein the obtained time offset is used as one of the positive-going time offset and the negative-going time offset, and wherein the positive-going time offset and the negative-going time offset are different time offsets based on different threshold voltages used for detecting the positive-going zero-crossings of the input signal waveform and the negative-going zero crossings of the input signal waveform.

8. The method of claim 6, wherein the positive-going time offset and the negative-going time offset are measured or assumed to be equal.

9. The method of claim 2, wherein the microcontroller is configured to disregard at least one of the corresponding detected transitions of the output signal received by the microcontroller from the zero-crossing detector.

10. The method of claim 2, wherein the microcontroller comprises an input, and wherein the determining the times of the corresponding detected transitions uses the input to capture numerical values of a counter upon transitions of the corresponding detected transitions detected, the captured numerical values being the determined times of the corresponding detected transitions, and wherein the adjusting the determined times corrects the captured numerical values to produce corrected numerical values as the actual times of the plurality of zero-crossings of the input AC waveform.

11. The method of claim 10, further comprising using the corrected numerical values to calculate at least one of a frequency of the input AC waveform and times at which to switch a switching circuit electrically coupled in series between the line input terminal and a load output terminal of the electrical load controller in order to control power to the load.

12. The method of claim 11, wherein the switching circuit comprises a triode for alternating current (TRIAC), metal-oxide semiconductor field-effect transistor (MOSFET), insulated-gate bipolar transistor (IGBT), or silicon-controlled rectifier (SCR).

13. The method of claim 1, wherein adjusting comprises adjusting the determined time of the corresponding detected transition by the time offset to produce the time of the zero-crossing of the input AC waveform.

14. The method of claim 1, wherein the time offset is a first time offset, and wherein the method further comprises obtaining a second time offset, the second time offset being an amount of time corresponding to a phase difference between the input AC waveform at the line input terminal and the input signal waveform at the input of the zero-crossing detector circuit, and wherein the adjusting the determined time of the corresponding detected transition uses a function of at least the first time offset, the second time offset, and at least one other value, in adjusting the determined time.

15. The method of claim 1, wherein the electrical load controller is a two-wire device configured to operate without a connection to neutral.

16. The method of claim 15, wherein the two-wire device is configured to be electrically coupled to the input AC waveform by a phase wire and a load wire.

17. The method of claim 1, further comprising:
determining a half-cycle time of the input signal waveform, the half-cycle time being a duration of time representative of a time for a half-cycle of the input signal waveform to complete, as:
  (i) a duration of a pulse width of a pulse of one or more pulses defined by transitions of the output signal; or
  (ii) an average of a plurality of durations of a corresponding plurality of pulse widths of a plurality of pulses defined by the transitions of the output signal; and
adjusting the determined half-cycle time using the time offset to provide an adjusted half-cycle time, the adjusted half-cycle time being a duration of a half-cycle of the input AC waveform.

18. The method of claim 17, further comprising determining a frequency of the input AC waveform as double the adjusted half-cycle time.

19. An electrical load controller for controlling conduction of a supply of alternating current (AC) power to a load, the supply of AC power having an input AC waveform, the input AC waveform comprising zero-crossings between positive and negative half-cycles of the input AC waveform, and the electrical load controller comprising:
a line input terminal and a load output terminal, the line input terminal configured to be electrically coupled to the supply of AC power and receive the input AC waveform thereof, and the load output terminal configured to be electrically coupled to the load;
a switching circuit electrically coupled in series between the line input terminal and the load output terminal, the switching circuit having an ON state in which the switching circuit conducts the supply of AC power to the load, and an OFF state in which the switching circuit does not conduct the supply of AC power to the load;
a zero-crossing detector circuit configured to receive an input signal waveform, representative of the input AC waveform, at an input of the zero-crossing detector circuit and to output an output signal from an output of the zero-crossing detector circuit; and
a microcontroller, the microcontroller configured to receive from the zero-crossing detector circuit the output signal therefrom, and to perform a method comprising:
  obtaining a time offset, the time offset representing an amount of time between:
    (i) a zero-crossing of the input signal waveform at the input of the zero-crossing detector circuit; and
    (ii) a corresponding detected transition of the output signal from the output of the zero-crossing detector circuit to the microcontroller, the detected transition corresponding to a zero-crossing of the zero-crossings of the input signal waveform and indicating a zero-crossing of the input AC waveform; and
  determining an actual time of the zero-crossing of the input AC waveform, comprising:
    determining a time of the corresponding detected transition; and
    adjusting the determined time of the corresponding detected transition to produce the time of the zero-crossing of the input AC waveform, wherein the adjusting uses the time offset.

20. The electrical load controller of claim 19, wherein the method further comprises repeating the method to determine actual times of zero-crossings of a plurality of zero crossings of the input AC waveform.

21. The electrical load controller of claim 20, wherein the adjusting the determined times of the corresponding detected transitions uses the time offset in adjusting each of the determined times.

22. The electrical load controller of claim 20, wherein the method further comprises, as part of the repeating, obtaining the time offset one or more times to obtain one or more other time offsets, the one or more other time offsets being used in adjusting at least some of the corresponding detected transitions.

23. The electrical load controller of claim 20, wherein the zero-crossings of the input AC waveform comprise positive-going zero-crossings of the input AC waveform and negative-going zero-crossings of the AC waveform.

24. The electrical load controller of claim 23, wherein the adjusting the determined times of the corresponding transitions comprises:
- using a positive-going time offset, representing amounts of time between (i) zero-crossings of the input signal waveform indicative of the positive-going zero-crossings of the input AC waveform and (ii) a first group of detected transitions of the corresponding detected transitions, each transition of the first group of detected transitions indicating a respective positive-going zero-crossing of the input AC waveform; and
- using a negative-going time offset representing amounts of time between (i) zero-crossings of the input signal waveform indicative of the negative-going zero-crossings of the input AC waveform and (ii) a second group of detected transitions of the corresponding detected transitions, each transition of the second group of detected transitions indicating a respective negative-going zero-crossing of the input AC waveform; and
- wherein the obtained time offset is used as at least one of the positive-going time offset and the negative-going time offset.

25. The electrical load controller of claim 24, wherein the obtained time offset is used as one of the positive-going time offset and the negative-going time offset, and wherein the positive-going time offset and the negative-going time offset are different time offsets based on different threshold voltages used for detecting the positive-going zero-crossings of the input signal waveform and the negative-going zero crossings of the input signal waveform.

26. The electrical load controller of claim 24, wherein the positive-going time offset and the negative-going time offset are measured or assumed to be equal.

27. The electrical load controller of claim 20, wherein the microcontroller is configured to disregard at least one of the corresponding detected transitions of the output signal received by the microcontroller from the zero-crossing detector.

28. The electrical load controller of claim 20, wherein the microcontroller comprises an input, and wherein the determining the times of the corresponding detected transitions uses the input to capture numerical values of a counter upon transitions of the corresponding detected transitions detected, the captured numerical values being the determined times of the corresponding detected transitions, and wherein the adjusting the determined times corrects the captured numerical values to produce corrected numerical values as the actual times of the plurality of zero-crossings of the input AC waveform.

29. The electrical load controller of claim 28, wherein the method further comprises using the corrected numerical values to calculate at least one of a frequency of the input AC waveform and times at which to switch a switching circuit electrically coupled in series between the line input terminal and a load output terminal of the electrical load controller in order to control power to the load.

30. The electrical load controller of claim 19, wherein adjusting comprises adjusting the determined time of the corresponding detected transition by the time offset to produce the time of the zero-crossing of the input AC waveform.

31. The electrical load controller of claim 19, wherein the time offset is a first time offset, and wherein the method further comprises obtaining a second time offset, the second time offset being an amount of time corresponding to a phase difference between the input AC waveform at the line input terminal and the input signal waveform at the input of the zero-crossing detector circuit, and wherein the adjusting the determined time of the corresponding detected transition uses a function of at least the first time offset, the second time offset, and at least one other value, in adjusting the determined time.

32. The electrical load controller of claim 19, wherein the electrical load controller is a two-wire device configured to operate without a connection to neutral.

33. The electrical load controller of claim 32, wherein the two-wire device is configured to be electrically coupled to the input AC waveform by a phase wire and a load wire.

34. The electrical load controller of claim 19, wherein the switching circuit comprises a triode for alternating current (TRIAC), metal-oxide semiconductor field-effect transistor (MOSFET), insulated-gate bipolar transistor (IGBT), or silicon-controlled rectifier (SCR).

35. The electrical load controller of claim 19, wherein the method further comprises:
- determining a half-cycle time of the input signal waveform, the half-cycle time being a duration of time representative of a time for a half-cycle of the input signal waveform to complete, as:
  - (i) a duration of a pulse width of a pulse of one or more pulses defined by transitions of the output signal; or
  - (ii) an average of a plurality of durations of a corresponding plurality of pulse widths of a plurality of pulses defined by the transitions of the output signal; and
- adjusting the determined half-cycle time using the time offset to provide an adjusted half-cycle time, the adjusted half-cycle time being a duration of a half-cycle of the input AC waveform.

36. The electrical load controller of claim 35, wherein the method further comprises determining a frequency of the input AC waveform as double the adjusted half-cycle time.

* * * * *